(12) United States Patent
Kawano et al.

(10) Patent No.: US 6,233,339 B1
(45) Date of Patent: May 15, 2001

(54) PHYSICAL PROPERTY BASED CRYPTOGRAPHICS

(75) Inventors: Kenji Kawano; Masahiro Taguchi; Masaki Hirota; Junji Okada; Masao Funada; Takashi Ozawa, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 08/956,418

(22) Filed: Oct. 23, 1997

(30) Foreign Application Priority Data

Oct. 25, 1996 (JP) .................................................. 8-284475
Jul. 1, 1997 (JP) .................................................. 9-175488

(51) Int. Cl.[7] .............................. H04L 9/00; H04L 17/02; G06F 11/30; G06F 12/14
(52) U.S. Cl. ............................... 380/44; 380/52; 713/194
(58) Field of Search ................................ 380/44, 52, 53, 380/46; 713/194

(56) References Cited

U.S. PATENT DOCUMENTS

| | | | |
|---|---|---|---|
| 4,819,267 | * | 4/1989 | Cargile et al. .......................... 380/23 |
| 4,860,351 | * | 8/1989 | Weingart ................................. 380/3 |
| 4,937,865 | * | 6/1990 | Barany ................................... 380/7 |
| 5,010,573 | * | 4/1991 | Musyck et al. ........................ 380/28 |
| 5,027,397 | | 6/1991 | Double et al. . |
| 5,117,457 | * | 5/1992 | Comerford et al. ..................... 380/3 |
| 5,159,629 | | 10/1992 | Double et al. . |
| 5,301,981 | * | 4/1994 | Nesis .................................... 283/73 |
| 5,307,410 | * | 4/1994 | Bennett ................................. 380/21 |
| 5,353,350 | * | 10/1994 | Unsworth et al. ....................... 380/3 |
| 5,406,630 | * | 4/1995 | Piosenka et al. ..................... 380/52 |
| 5,412,718 | * | 5/1995 | Narasimhalu et al. ................. 380/4 |
| 5,557,679 | * | 9/1996 | Julin et al. ........................... 380/23 |
| 5,712,912 | * | 1/1998 | Tomko et al. ........................ 380/23 |
| 5,732,138 | * | 3/1998 | Noll et al. ............................ 380/28 |
| 5,745,578 | * | 4/1998 | Hassan et al. ........................ 380/44 |
| 5,790,670 | * | 8/1998 | Bramlett ............................... 380/52 |
| 5,881,155 | * | 3/1999 | Rigal ................................... 380/44 |
| 5,915,025 | * | 6/1999 | Taguchi et al. ...................... 380/44 |
| 6,028,935 | * | 2/2000 | Rarity et al. ......................... 380/21 |

FOREIGN PATENT DOCUMENTS

B2-61-61740  12/1986  (JP) .
63-78250   4/1988  (JP) .

OTHER PUBLICATIONS

Lavarand.sgi.com.*
Surface–Micromachined Capacitive Differential Pressure Sensor with Lithographically Defined Silicon Diaphragm, Carlos H. Mastrangelo, Xia Zhang and William C. Tang, Journal of Microelectromechanical Systems, vol. 5, No. 2, Jun. 1996, pp. 98–105.

* cited by examiner

Primary Examiner—Tod R. Swann
Assistant Examiner—Douglas J. Meislahn
(74) Attorney, Agent, or Firm—Oliff & Berridge, PLC

(57) ABSTRACT

According to the present invention, piracy of secret data is prevented without an attack detecting circuit or data deleting circuit. In a secret data processing unit, a cell contains fluid in a sealed space. Code generators arranged in the sealed space receive a code generation request to generate codes specified by the pressure value of the fluid. A key generator disposed in the sealed space generates encryption keys/decryption keys specified by the generated codes. An encryptor/decryptor also disposed in the sealed space receives requests for secret data encryption/requests for encrypted secret data decryption, and outputs code generation requests to the code generator to encrypt the secret data/decrypt the encrypted secret data by using the generated encryption key/decryption key. Both codes and encryption keys/decryption keys generated and used, are not statically stored in the cryptographic processing unit.

43 Claims, 26 Drawing Sheets

PHYSICAL PROPERTY BASED CRYPTOGRAPHICS

BACKGROUND OF THE INVENTION

1. Field of the Invention

The present invention relates to an encryptor, a decryptor, a cryptographic processor, and a computer system, more specifically, to an encryptor for encrypting plain text, a decryptor for decrypting cypher text, and a cryptographic processor for cryptographic service, and a computer system for the purpose of protecting secret data against intrusion.

2. Description of the Prior Art

Recently, as computer networks are expanding rapidly, techniques for protecting critical digital information have been remarked. One of such techniques is to store digital information (referred to as secret data hereinbelow) to be secured into a storage device after encryption.

Sufficient attention should be paid for safety operation of encryption technique, especially in the dealing of secret information such as encryption keys and decryption keys. In general, for an encryption technique within an communication devices, such secret information is stored in a non-volatile memory. Such a non-volatile memory is enclosed in a molded resin so as to protect against intrusion. This may allow secret information not to be leaked if sufficient access control is performed.

However, if some highly value-added data is encrypted and if its secret information (decryption key) is protected with such a level of protection, the secret information may be stolen. A molded resin may be removed by melting it, then it may be possible that any secret information may be stolen by probing charge information in a memory cell. At present, smart cards have been applied in the field of electric money and electric commerce. In these fields, the problem described above becomes so serious that it cannot be ignored.

In order to prevent piracy, there is a method in which secret information is stored in a RAM (Random Access Memory), a kind of volatile memory (see, Japanese Published Examined Application No. S61-61740 entitled "communication secret apparatus"). RAM is supplied with power through a micro-switch. If the box incorporating the RAM is pulled out from its attachment for the purpose of stealing secret information, the micro-switch opens to cut off the power supply. When the power is interrupted, the secret information stored in the RAM evaporates to ensure the security.

However, this method has a disadvantage that the data is not evaporated by cutting off the power supply if the box incorporating the RAM is held in a cryogenic temperature environment.

There is also another method of making a special box for preventing intrusion (see, Japanese Published Examined Application No. S63-78250 entitled "a data security device for protecting stored data"). This special box is formed of a top plate, a bottom plate, and four side plates including curved conductive wires respectively. Two conductive wires compose parallel conductive lines. A detection circuit is formed to generate a reset signal if there is an intrusion by creating a short circuit or earth connection of the conductive lines. The secret information stored in a memory within this box is erased when a reset signal is generated. The plates forming the box are made of ceramics, which protect against chemical attack. In addition, a temperature sensor is provided within the box in order to protect from an attack attempting to knock out the detection circuit by freezing.

There has been proposed a method for improving the sensitivity against intrusion into the box, in which a barrier protects an electric assembly from mechanical or chemical attack (see, U.S. Pat. No. 5,027,397 and 5,159,629 entitled "Data protection by detection of intrusion into electric assembles"). The intrusion barrier includes a screen material surrounding the electronic assembly, on which screen conductive lines are formed, and conductors connected to power supply means and to signal detector means. These conductive lines are formed of conductive particles of material dispersed in a solidified matrix. These conductive lines are very finely patterned so as to change resistance when a mechanical or chemical attack is made to the intrusion barrier.

By applying such a intrusion barrier to the electronic assembly, if a chemical or mechanical attack is attempted, some conductive particles lose their mechanical integrity so that the intrusion detector detects the variance of resistance of conductor circuit and thereby erase the secret information in the volatile memory.

SUMMARY AND OBJECTS OF THE INVENTION

Problem to be Solved by the Invention

Both methods as described above require, always, an attack detecting circuit for detecting an attack attempt, and a data deleting circuit for erasing the secret information stored in a memory. The attack detecting circuit and data deleting circuit are to operate as long as any secret information is stored in the memory. However, for a portable communication device, the electricity to these circuits is an excessive load. In addition, these methods are not applicable for smart cards which incorporate no power supply.

In both methods as described above, the operation of the attack detector (detection of any attack) triggers deleting secret information, self destructively. Thus, for example, if an erroneous operation due to noise and the like occurs once, the secret data could not be decrypted thereafter.

The present invention has been made in view of these disadvantages in the prior art, by providing an encryptor, decryptor, and cryptographic processor which protect security information against intrusion.

For improving the ability of attack detection in any of the attack detecting method of the prior art, sensors or conductive particles forming an attack detector should be provided in any outer walls of the box in a high density, leading a huge quantity of circuits to be installed. In addition, in order to protect against a freezing attack to these attack detectors, a temperature sensor should be provided. This causes the device to be complex, and to be expensive.

The present invention has been made in view of these disadvantages in the prior art, by providing an encryptor, decryptor, and cryptographic processor comprising an attack detecting circuit which may detect any attacks with fewer circuits.

This invention decreases the number of components, while providing an encryptor, decryptor, and cryptographic processor which protects against intrusion and prevents secret data from being pirated.

Means for Solving the Problem

In order to solve the problems above, according to the present invention, an encryptor for encrypting secret data is provided which comprises: means for containing fluid in a sealed space; means for generating code specified by the pressure value of the fluid; means disposed in the sealed space for generating encryption key based on the code; and means disposed in the sealed space for generating encrypted secret data by encrypting the secret data.

In an encryption device having such a structure, a fluid container means retains fluid in a sealed space. The code generator means disposed in the sealed space generates codes specified by the pressure value of the fluid. The sealed space may be partitioned into a plurality of sections, where the code generator may generate specific codes from the ratio or the difference of the pressure value of the fluid contained in the plurality of sealed spaces. The encryption key generator disposed in the sealed space generates a encryption key based on a code thus generated. The encryption means disposed in the sealed space encrypts the secret data by using said encryption key.

As can be seen, according to the encryptor of the present invention, neither encryption key nor codes used for encryption of secret data are stored in a memory. This prevents any intrusion to the encryption processing of the secret data without providing an attack detection circuit or a data deleting circuit.

Also according to the present invention, in order to solve the problems described above an encryption device for encrypting secret data is provided which comprises: a capacitor being composed of a pair of electrodes and an isolating film which covers at least one of the electrodes, and having static capacitance according to the characteristic values of the isolating film; means coated by the isolating film, for generating codes specified from the static capacitance of the capacitor; means for generating encryption keys according to the codes; and means for generating encrypted secret data by encrypting the secret data by using said encryption key.

In an encryption device having such a structure, the capacitor comprised of a pair of electrodes and an isolating film which covers at least one of the electrodes has static capacitance according to the characteristic values of the isolating film. The means coated by the isolating film for generating codes generates codes specified by the static capacitance of the capacitor. The means for generating encryption keys generates encryption keys according to the codes. The means for generating encrypted secret data encrypts the secret data by using said encryption key. As can be seen, the encryptor according to the present invention stores neither encryption keys nor codes used for encrypting secret data in a memory. This prevents any intrusion to the encryption process of the secret data without providing an attack detection circuit or a data deleting circuit.

In addition, according to the present invention, in order to solve the problems above, a decryption devece is provided which comprises fluid container means for retaining fluid in a sealed space; means disposed in the sealed space for generating codes specific to a pressure value of the fluid; means disposed in the sealed space for generating decryption key based on the codes; and means disposed in the sealed space for restoring secret data by decrypting the encrypted secret data by using said decryption key.

In an decryption device having such a structure, the fluid container means for containing fluid retains fluid in a sealed space. The means disposed in the sealed space for generating codes generates codes specific to a pressure value of the fluid. The sealed space may be partitioned into a plurality of sections, where the code generator may generate specific codes from the ratio or the difference of the pressure value of the fluid contained in the plurality of sealed spaces. The means disposed in the sealed space for generating decryption key generates decryption keys based on the codes. The means disposed in the sealed space for restoring secret data also restores the secret data by decrypting the encrypted secret data by using said decryption key.

As can bee seen, according to the decryptor of the present invention, neither decryption key nor codes used for decryption of encrypted secret data are stored in a memory. This prevents any intrusion to the decryption processing of the encrypted secret data without providing an attack detection circuit or a data deleting circuit.

Furthermore, in order to solve the problems above, according to the present invention, a decryption device is provided which includes a capacitor comprising a pair of electrodes, and an isolating film which covers at least one of the electrodes, and having static capacitance according to the characteristic values of the isolating film; means coated by the isolating film, for generating codes specified from the static capacitance of the capacitor; means for generating decryption keys according to the codes; means for generating secret data by decrypting the encrypted secret data by using said decryption key.

In a decryptor having such a structure, a capacitor comprising a pair of electrodes and an isolating film which covers at least one of the electrodes has a static capacitance corresponding to the characteristic values of the isolating film. The means coated by the isolating film for generating codes generates codes specified from the static capacitance of the capacitor. The means for generating decryption keys generates decryption keys according to the codes. The decryption means generates secret data by decrypting the encrypted secret data by using said decryption key.

As can bee seen, according to the decryptor of the present invention, neither decryption key nor codes used for decryption of encrypted secret data are stored in a memory. This prevents any intrusion to the decryption processing of the encrypted secret data without providing an attack detection circuit or a data deleting circuit.

In addition, in order to solve the problems above, the present invention provides a cryptographic processing unit for processing secret data for protecting from intrusion, the device comprising: fluid container means for containing fluid in a sealed space; means disposed in the sealed space for generating codes specific to a pressure value of the fluid; encryption means disposed in the sealed space, for generating encrypted secret data by encrypting the secret data by generating encryption key based on the code generated by the code generation means at the time of a request for encryption; and decryption means disposed in the sealed space, for generating secret data by decrypting the encrypted secret data by generating decryption key based on the code generated by the code generation means at the time of a request for decryption.

In a cryptographic processor having such a structure, the fluid container means retains fluid in a sealed space; the code generator means disposed in the sealed space generates codes specific to a pressure value of the fluid; the encryption means is disposed in the sealed space and generates encrypted secret data by encrypting the secret data by generating encryption key based on the code generated by the code generation means at the time of a request for generating encrypted secret data for the secret data; and the decryption means is also disposed in the sealed space generates secret data by decrypting the encrypted secret data by generating decryption key based on the code generated by the code generation means at the time of a request for restoring secret data for the encrypted secret data.

As can be seen, according to the secret data processor of the present invention, neither encryption key nor codes used for encryption of secret data, nor decryption key nor codes used for decryption of encrypted secret data are stored in a memory. This prevents any intrusion to the encryption processing of the secret data without providing an attack detection circuit or a data deleting circuit.

Furthermore, in order to solve the problems above, the present invention provides a first embodiment of computer correspond to claims from 1 to 35 for processing secret data for protecting from intrusion, the processor comprising: fluid container means for retaining fluid in a sealed space; means disposed in the sealed space for carrying out a variety of processing with respect to the secret data; means disposed in the sealed space for generating codes specific to a pressure value of the fluid; encryption means disposed in the sealed space, for generating encrypted secret data by encrypting the secret data by using encryption key based on the code generated by the code generation means at the time of a request for encryption; data storage means for storing the encrypted secret data; and decryption means disposed in the sealed space, for generating secret data by decrypting the encrypted secret data by using decryption key based on the code generated by the code generation means at the time of a request for restoring secret data from data storage means.

In a computer having such a structure, the fluid container means retains fluid in a sealed space. The data processing means disposed in the sealed space carries out a variety of processing with respect to the secret data. The code generator means disposed in the sealed space generates a code specific to a pressure value of the fluid. The encryption means disposed in the sealed space generates encrypted secret data by using encryption key based on the code generated by the code generation means for encrypting the secret data. The data storage means stores the encrypted secret data. And the decryption means also disposed in the sealed space generates secret data by using decryption key based on the code generated by the code generation means for decrypting the encrypted secret data.

As can be seen, in a first embodiment computer of the present invention, such security items as the encryption key and codes used for encryption of secret data, and the decryption key and codes used for decryption of secret data are not stored in a memory. This prevents any intrusion to the encryption processing of the secret data without providing an attack detection circuit or a data deleting circuit.

In addition, in order to solve the problems above, the present invention provides a second embodiment of a computer correspond to claims from 36 to 40 comprising: fluid container means for retaining fluid in a sealed space; means disposed in the sealed space for carrying out a variety of processing with respect to the secret data; data storage means disposed in the sealed space for storing the security information; means disposed in the sealed space for generating security codes specified by a pressure value of the fluid; and data deleting means storing a reference security code as the sealed space is in normal condition, for deleting the security information in the data storage if the security code generated by the security code generation means is not matched with the reference security code.

In a computer having such a structure, the fluid container means retains fluid in a sealed space. The data processing means disposed in the sealed space carries out a variety of processing with respect to the secret data. The data storage means disposed in the sealed space stores the security information. The code generator means disposed in the sealed space generates security codes from a pressure value of the fluid. The data deleting means stores a reference security code as the sealed space is in normal condition, and deletes the security information in the data storage if the security code generated by the security code generation means is not matched with the reference security code.

As can be seen, the second embodiment of a computer according to the present invention detects the presence or absence of any attack by sensing the change in the pressure value in a sealed space for deleting security information. Thus, fewer attack detector circuits are sufficient for protecting against intrusion.

Figure 21A:
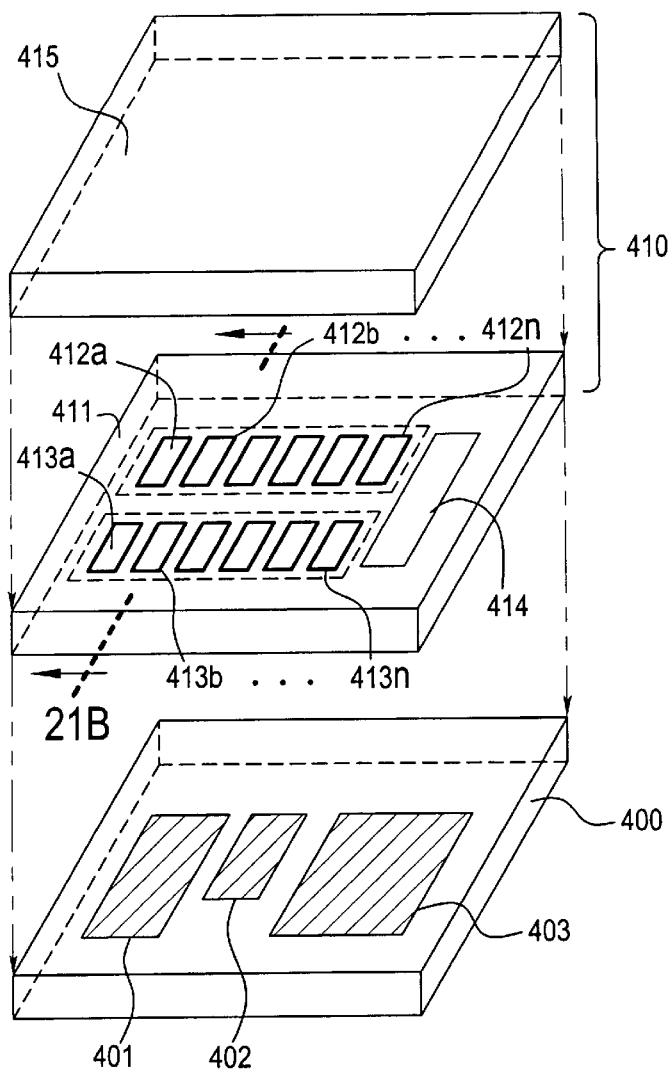
FIG. 21 shows eighth preferred embodiment of the first computer unit according to the present invention, FIG. 21
Figure 21B:
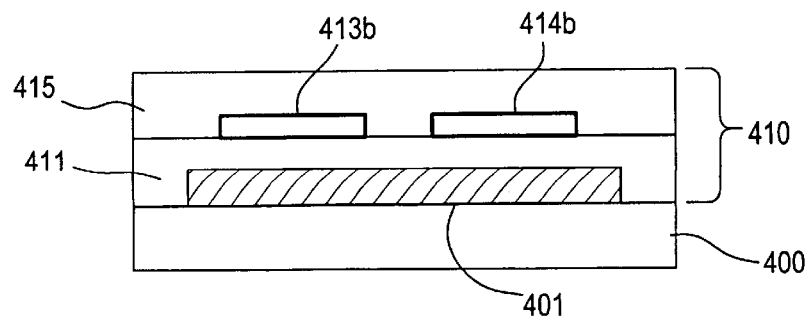
Figure 22A:
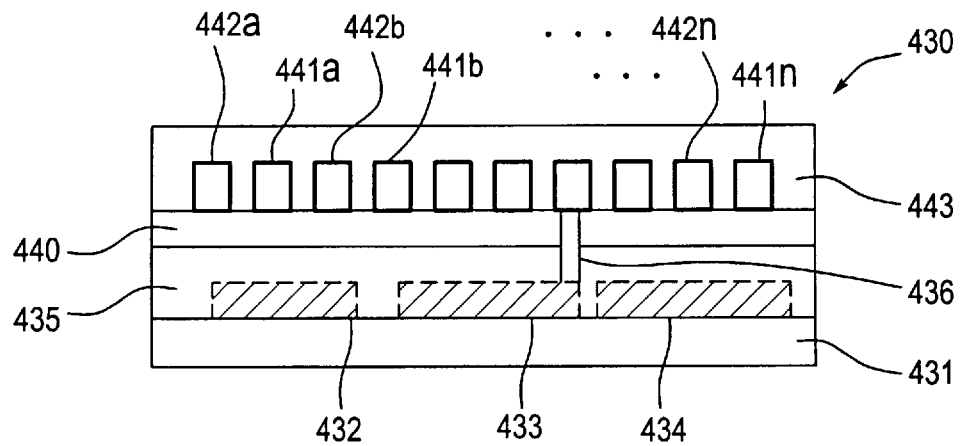
Figure 22B:
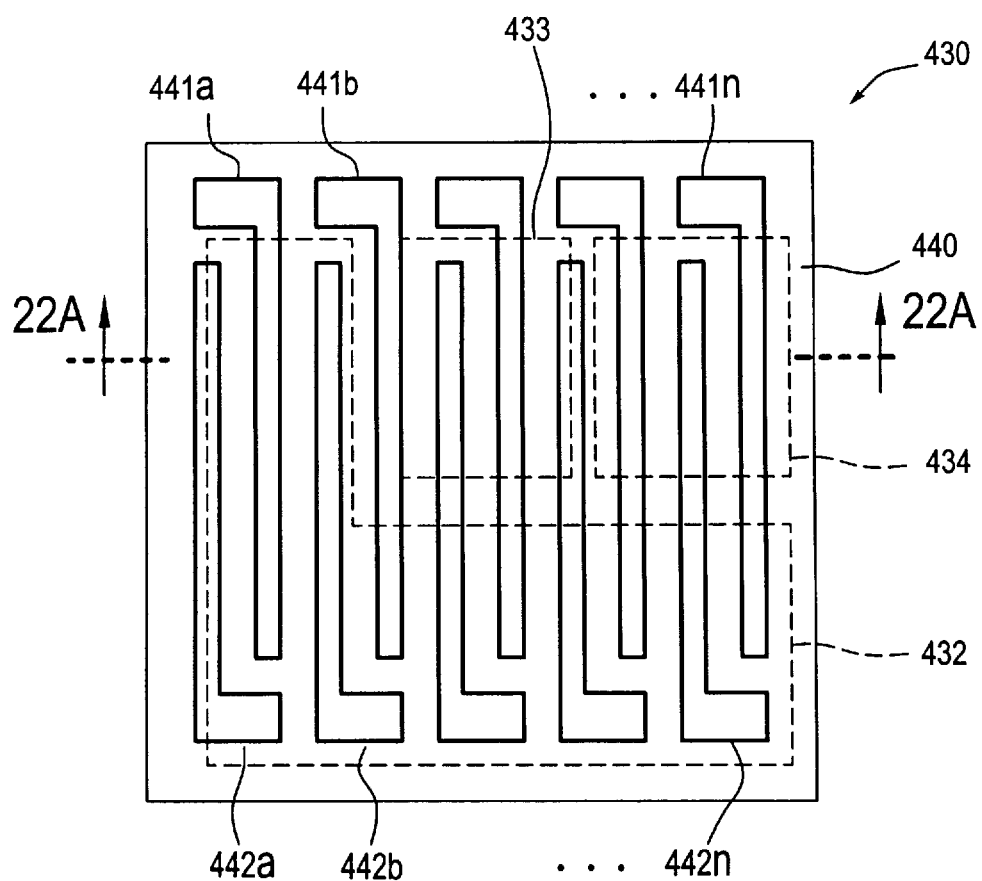
Figure 23:
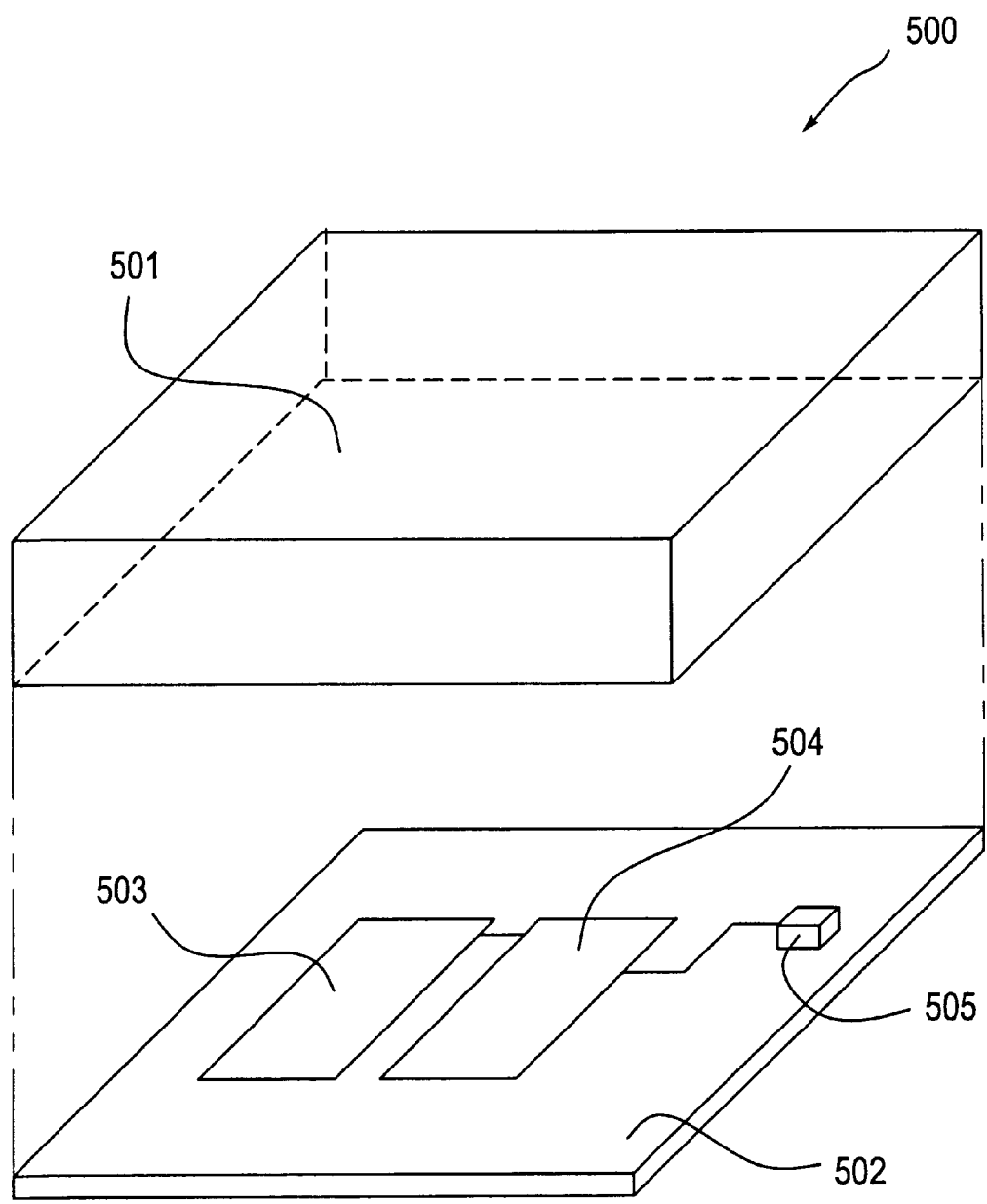
Figure 24:
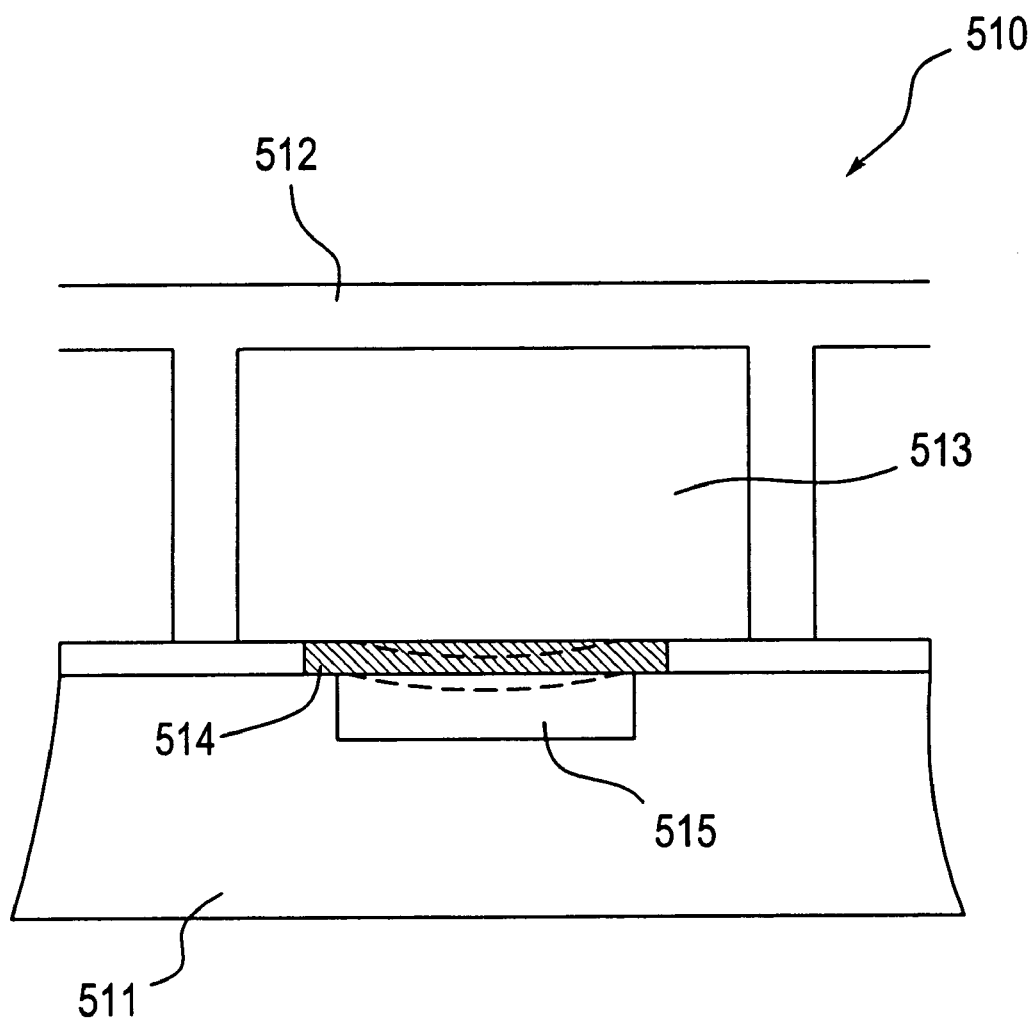
Figure 25:
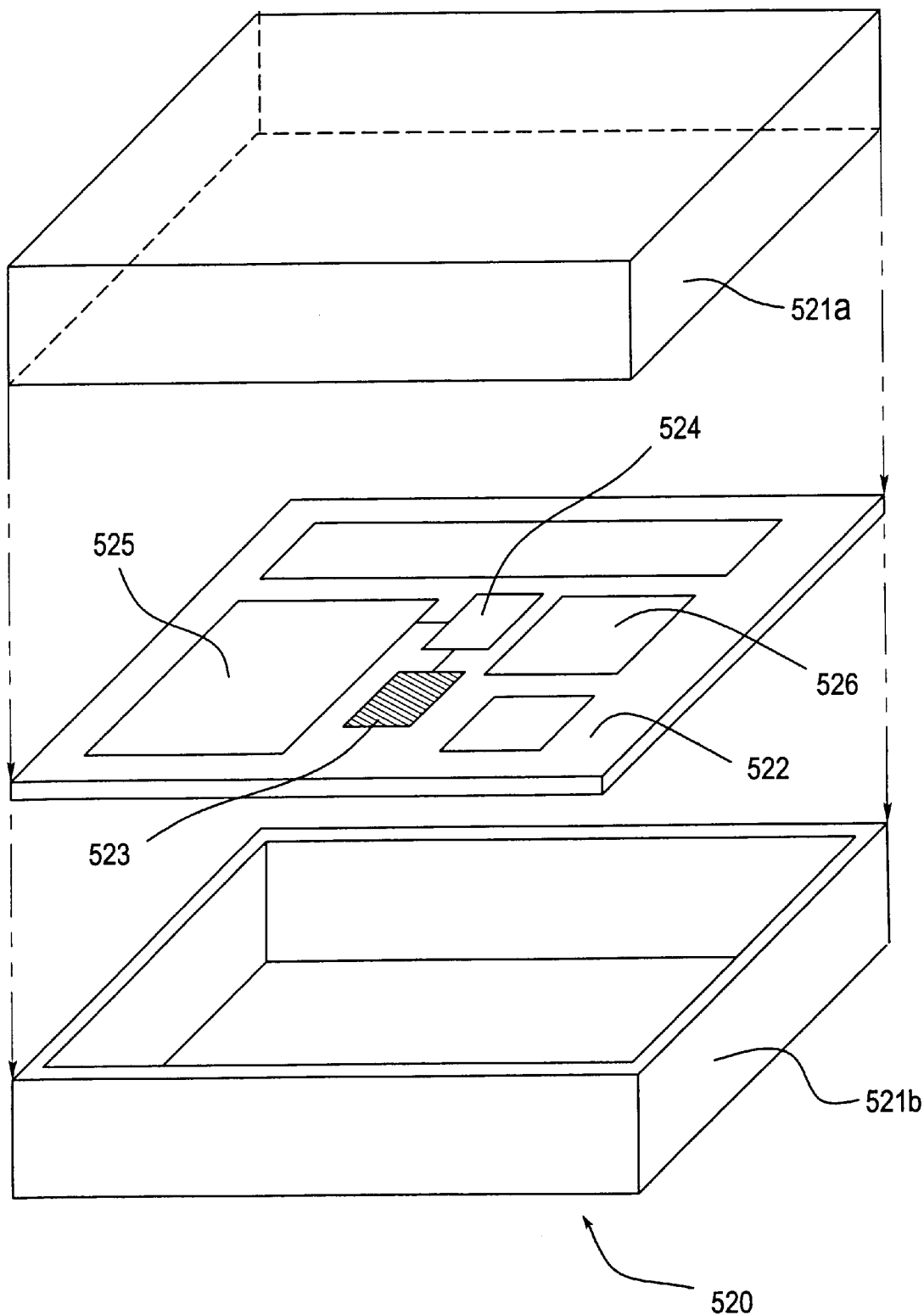
Figure 26:
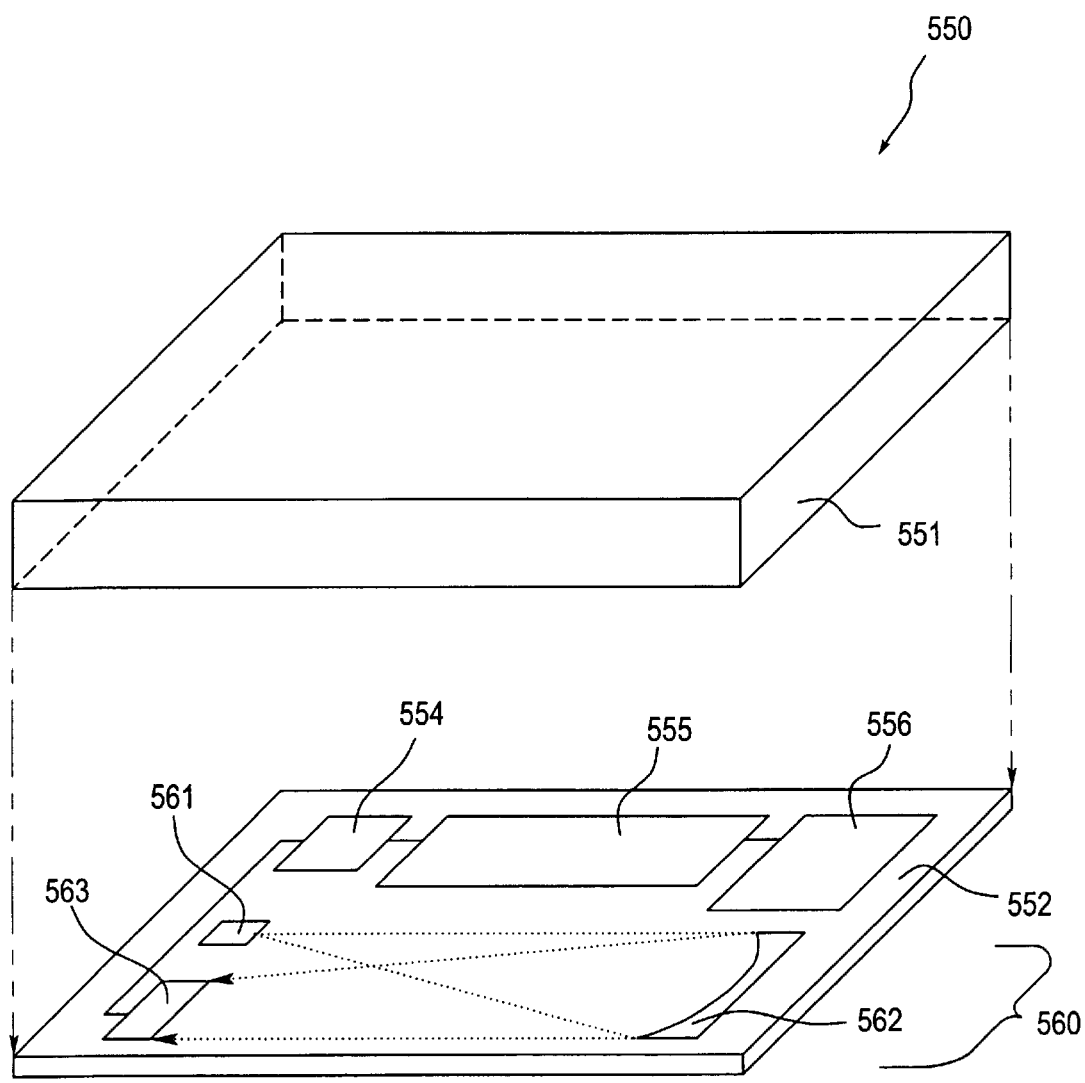

(A) is an exploded perspective view of the computer of the present invention, FIG. 21 (B) is a sectional view of the computer shown in FIG. 21 (A) taken along with the line AB;

FIG. 22 shows ninth preferred embodiment of the first computer unit according to the present invention, FIG. 22 (A) is a sectional view of the first computer according to the present invention, while FIG. 22 (B) is a perspective diagram of the unit shown in FIG. 22 (A) viewed from the direction F. The sectional view shown in FIG. 22 (A) is the one taken along with the line CD of the perspective view shown in FIG. 22 (B);

FIG. 23 is a schematic diagram showing first preferred embodiment of the second computer according to the present invention;

FIG. 24 is a sectional view illustrating the principle of an example of pressure sensor applicable to the security code generator 503 of the computer unit 500 shown in FIG. 23;

FIG. 25 is a schematic diagram showing second preferred embodiment of the second computer according to the present invention; and FIG. 26 is a schematic diagram showing third preferred embodiment of the second computer according to the present invention.

DETAILED DESCRIPTION OF THE PREFERRED EMBODIMENTS

The present invention is now described hereinbelow with reference to the accompanying drawings which depict some of preferred embodiments of the present invention.

Figure 1:
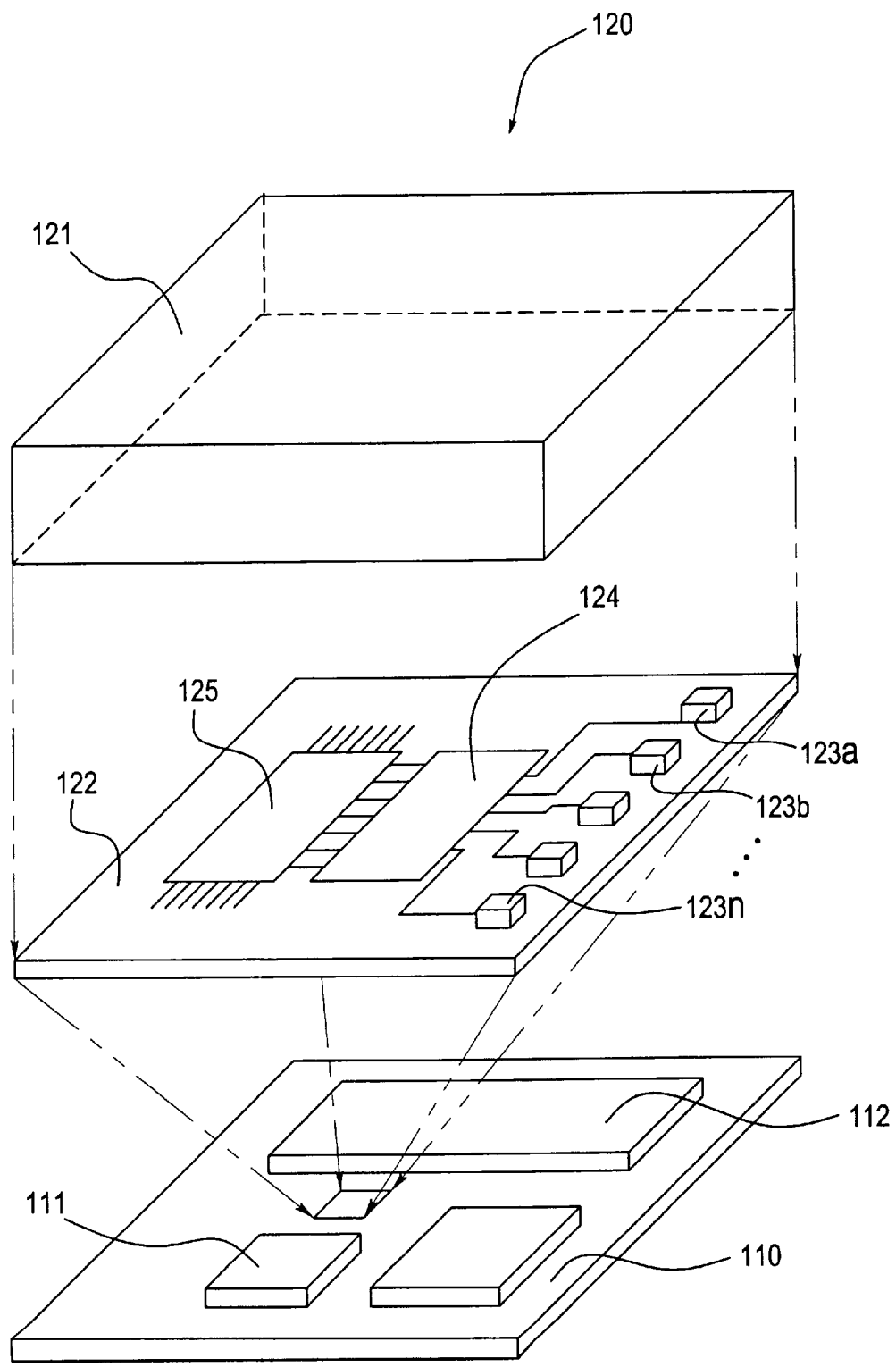
FIG. 1 shows first preferred embodiment of a first computer according to the present invention.

FIG. 1 shows first preferred embodiment of a first computer according to the present invention.

A cryptographic processing unit 120 is implemented on a substrate substrate 110 along with a micro processor 111 and memory circuit 112 and the like. Secret data processed by the micro processor 111 is stored as encrypted secret data in memory circuit 112 through the cryptographic processing unit 120, and is never stored as clear secret data. The encrypted secret data stored in the memory circuit 112 may decrypted at the cryptographic processing unit 120 as required. For the implementation of cryptographic processing unit 120 on the substrate 110, the cryptographic processing unit 120 is electrically connected thereto by forming a soldering bump at the bottom or by coupling with any contactless connection using electromagnetic wave.

The cryptographic processing unit 120 is formed by adhering a cell 121 to a substrate 122 to form a sealed space therein. Here in a "cell" 121 (a container containing fluid, which forms a sealed space along with a planar substrate adhered thereto) inert gas such as helium and argon, or a gas having compatible chemical stability is encapsulated in a course of manufacture at a given pressure. The cell 121 may be formed of materials which is chemically/physically durable such as ceramics and metals. The pressure of the gas is not necessarily at a specific level, rather, it is preferable to be an appropriate random value (random number). When joining the cell 121 with the substrate 122, any of methods with high strength such as laser welding, soldering which enables bonding at the atom level of materials, solid bonding, and the like, may be used for maintaining the high airtightness in a sealed space formed in the cryptographic processing unit 120.

To the substrate 122 code generators 123a, 123b, . . . , 123n, a key generator 124, and an encryptor/decryptor 125 are disposed. The key generator 124 is connected to the encryptor/decryptor 125 and the code generators 123a, 123b, . . . , 123n.

The encryptor/decryptor 125 is connected to the external circuitry such as micro processor 111 and memory circuit 112, for input/output of secret data and encrypted secret data, and reception of requests for generating encrypted secret data and decrypted data. It outputs a request for code generation to the code generators 123a, 123b, . . . , 123n when encrypting or decrypting.

The key generator 124 generates encryption keys and decryption keys based on the code generated at the code generators 123a, 123b, . . . , 123n. The code generators 123a, 123b, . . . , 123n which receive a code generation request from the encryptor/decryptor 125 generate a code specified by the pressure value of the gas encapsulated in the sealed space of the cryptographic processing unit 120.

The procedure of encrypting secret data by using the cryptographic processor 120 of such structure will be described below.

Figure 2:
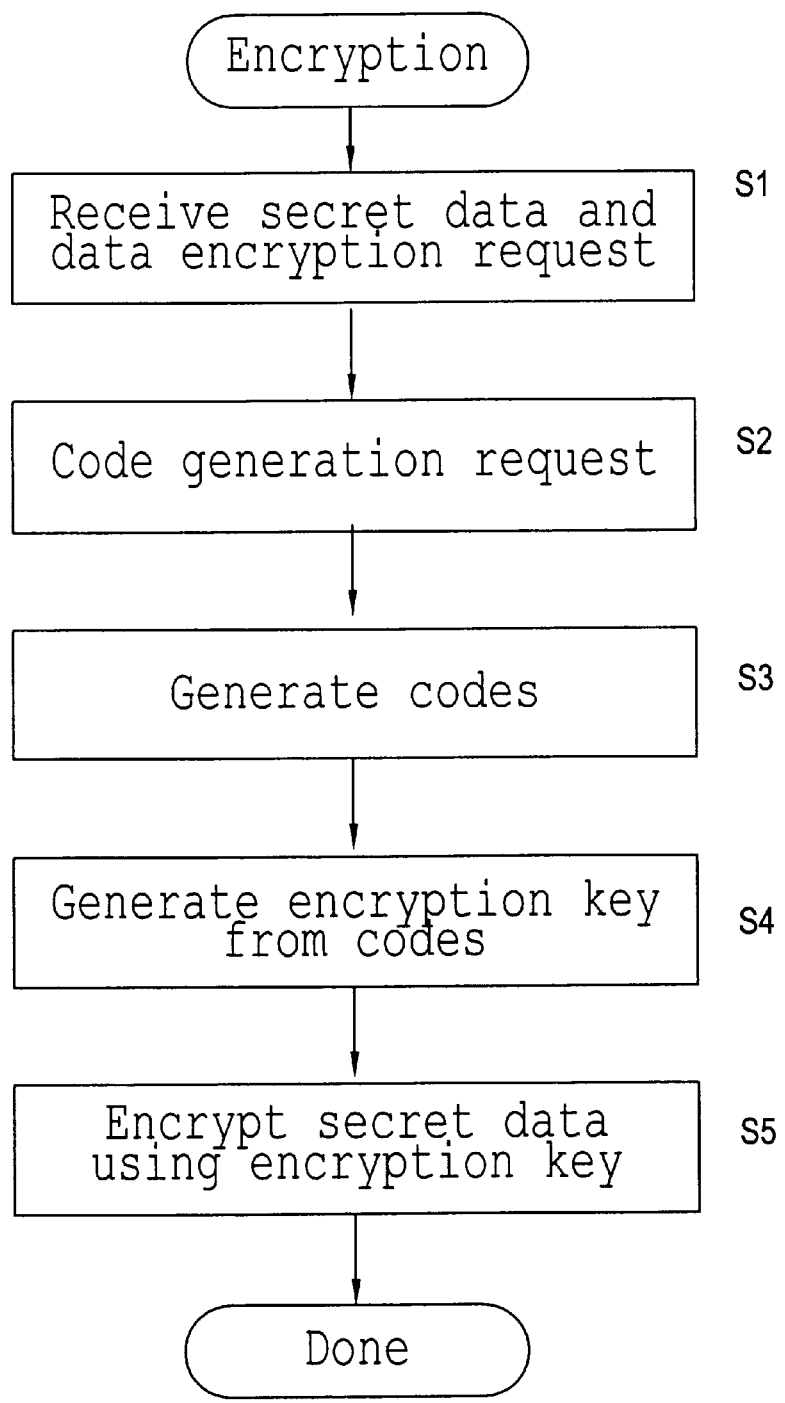
FIG. 2 is a flowchart showing how to encrypt secret data.

FIG. 2 is a flowchart showing the procedure for encryption of secret data.

The encryptor/decryptor 125 receives secret data and a request for generating encrypted secret data corresponding to the secret data (step S1). The encryptor/decryptor 125, upon receipt of a data encryption request, outputs a code generation request (step S2), and the code generators 123a, 123b, . . . , 123n in turn generates a code specified by the gas pressure in the sealed space (step S3). The key generator 124 generates an encryption key based on the code generated by the code generators 123a, 123b, . . . , 123n (step S4). The encryptor/decryptor 125 uses the encryption keys generated by the key generator 124 to generate encrypted secret data from the secret data (step S5).

Thus generated encrypted secret data is stored in the memory circuit 112, no invader can read secret data from outside. In this example as described above the encryption key/decryption key is generated based on the generated code, however the code may be used as is for the encryption key/decryption key. In the computer embodiment according to the present invention, it is not necessary to specify how to encrypt. In addition, although it has been described that the encryptor/decryptor 125 outputs a code generation request, the output may be derived from other elements such as micro processor 111. The code generator in the above description generates codes upon receipt of code generation requests, however it may always generates codes without providing a component which outputs a code generation request.

Here the procedure of decrypting thus generated encrypted secret data will be described below.

Figure 3:
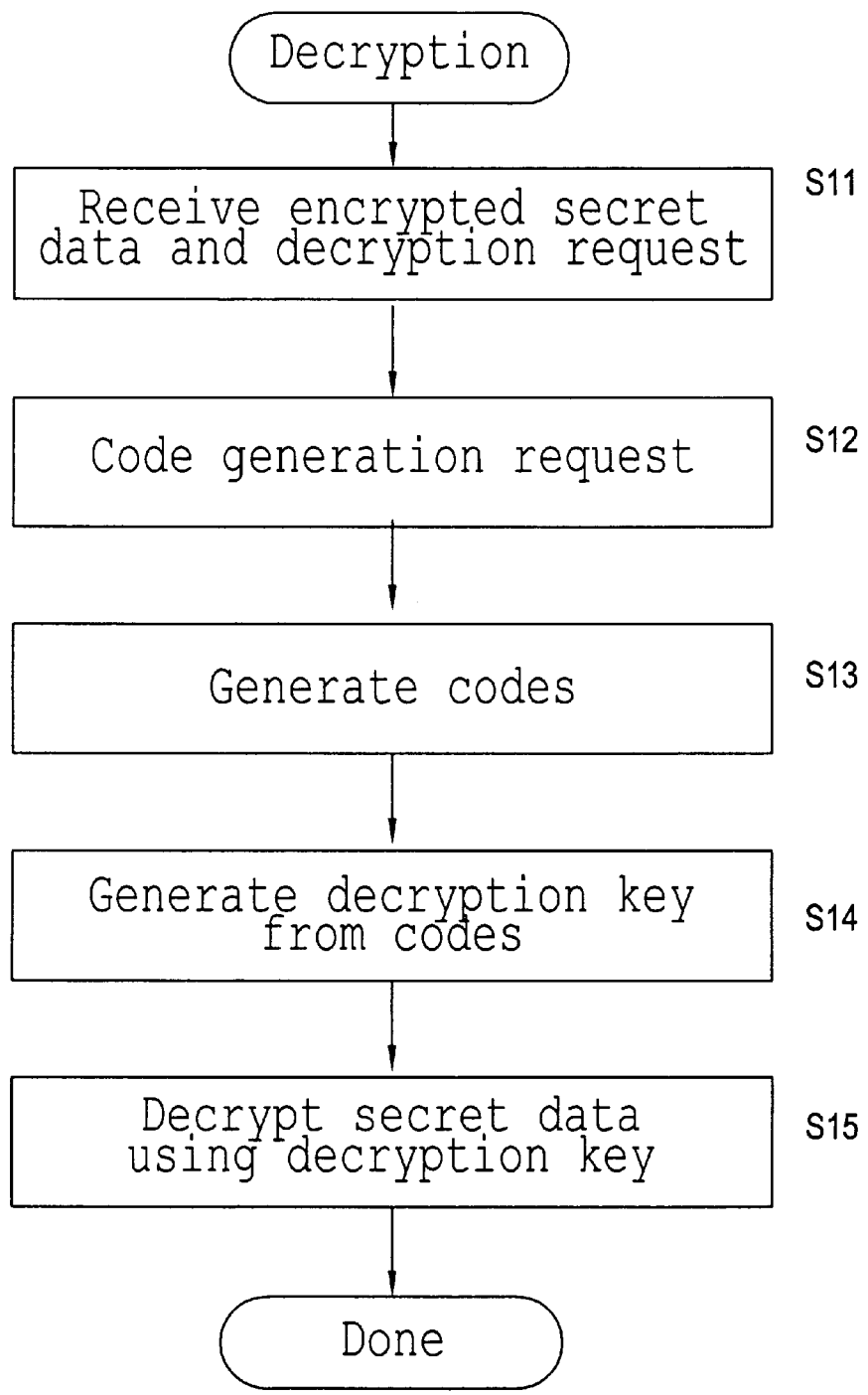
FIG. 3 is a flowchart showing how to decrypt encrypted secret data.

FIG. 3 is a flowchart showing how to decrypt encrypted secret data.

The encryptor/decryptor 125 receives encrypted secret data, and a request for generating secret data corresponding to the encrypted secret data (step S11). The encryptor/decryptor 125, upon receipt of a encrypted secret data decrypting request, outputs a code generation request (step S12), and the code generators 123a, 123b, . . . , 123n in turn generates a code specified by the gas pressure in the sealed space (step S13). The key generator 124 generates a decryption key based on the code generated by the code generators 123a, 123b, . . . , 123n (step S14). The encryptor/decryptor 125 then uses the decryption key generated by the key generator 124 to reconstruct secret data from the encrypted secret data (step S15).

The secret data thus generated may be dealt with by the micro processor 111. In this example although a decryption key is generated based on the generated code to be used for decryption of an encrypted secret data, the code may be used as is for the decryption key. What is important is that the decryption method corresponds with the encryption method. In the description above although the encryptor/decryptor 125 outputs code generation requests, the output may be derived from other components such as processor 111. Also the code generator in the above description generates codes upon receipt of code generation requests, however it may always generates codes without providing a component which outputs a code generation request.

An embodiment of the code generators 123a, 123b, . . . , 123n, a component of the cryptographic processing unit 120, will be described below. Although an example has been described with reference to FIG. 1 which comprises n code generators, the number of code generators may be arbitrary.

Figure 4A:
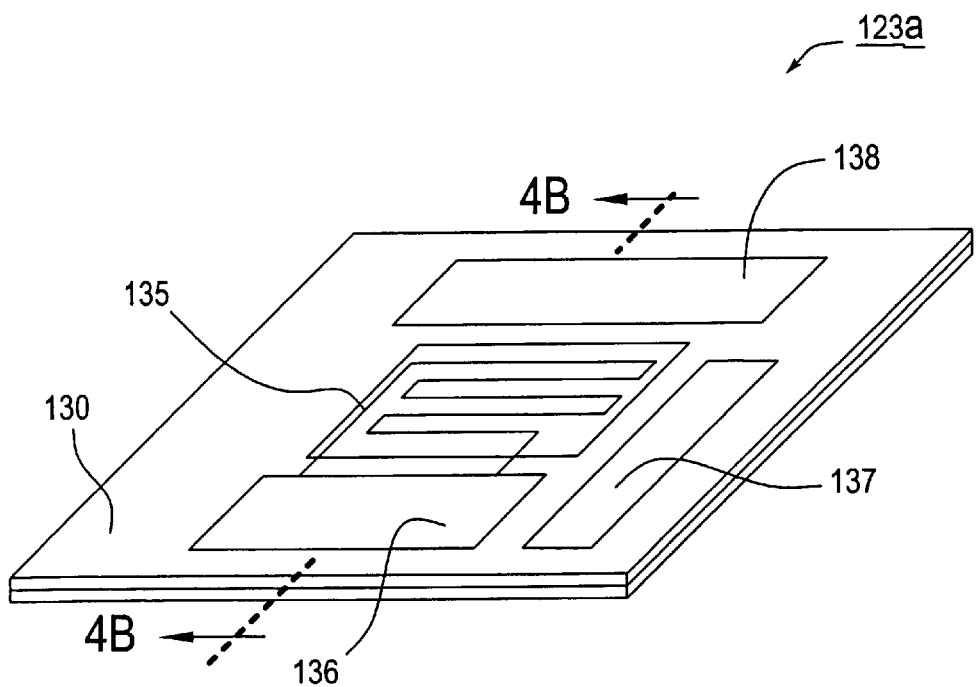
FIG. 4 is a first embodiment of code generators 123a, 123b, ..., 123n. Here, (A) shows a perspective view of code generators using a semiconductor pressure sensor, (B) shows a sectional view along with the line XY shown in (A) of the code generator using a semiconductor pressure sensor.
Figure 4B:
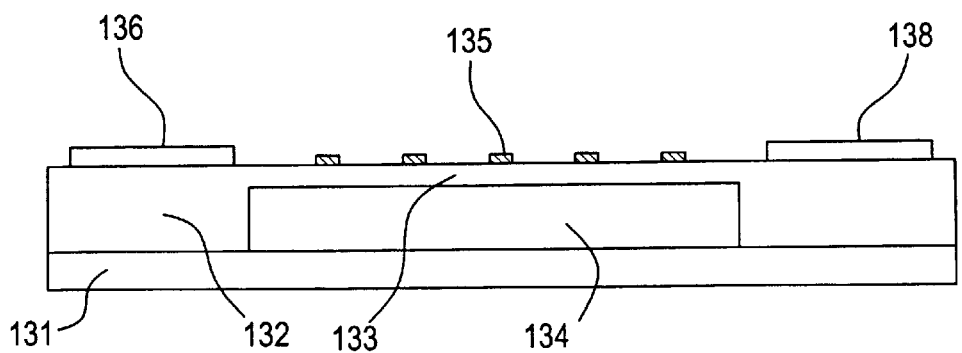

FIG. 4 is a first embodiment of code generators 123a, 123b, . . . , 123n. Here, (A) shows a perspective view of code generators using a semiconductor pressure sensor, (B) shows a sectional view along with the line XY shown in (A) of the code generator.

In this example, a product commercially available from "TOHOKU FUJIKURA CO. LTD" is used for the semiconductor pressure sensor. The structure of code generators 123b, . . . , 123n may be identical to the one 123a.

In this figure, a semiconductor pressure sensor 130 is formed by adhering a substrate 131 with another substrate 132. The substrate 132 comprises a diaphragm 133 receiving a pressure corresponding to its external pressure, which forms a cavity 134 therein when bonded to the substrate 131. To bond the substrate 131 with the substrate 132, welding or soldering may be used, so as to ensure the high airtightness of the cavity 134 formed therein. On the diaphragm 133 of substrate 132 a collection of piezoelectric element 135 is integrated, while in location on the substrate 132 other than diaphragm 133 a detector 136, an amplifier 137, and A/D (analog to digital) converter 138 are implemented.

An actual structure of the detector 136 integrated on the semiconductor pressure sensor 130 will be described below.

Figure 5:
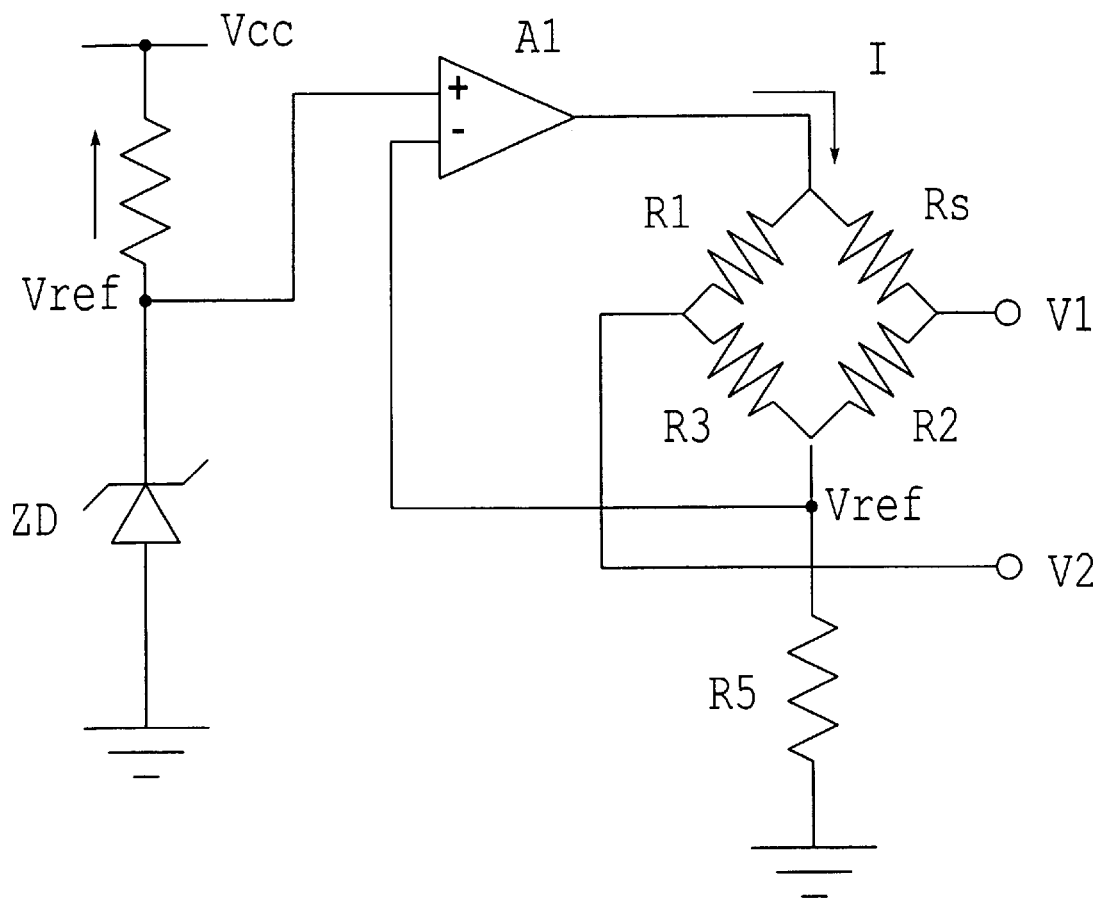
FIG. 5 is a circuit diagram showing a detector 136 integrated on the semiconductor pressure sensor 130 shown in FIG. 4.

FIG. 5 is a circuit diagram showing a detector 136 integrated on the semiconductor pressure sensor 130 shown in FIG. 4.

In this figure, Vcc designates to a power supply, externally applied. R1, R2, R3, R4, and R5 are resistor, Rs is a piezoelectric element 135 shown in FIG. 4. V1 and V2 are output terminals, connected to the amplifier 137. ZD is a Zener diode, which produces a constant voltage Vref across its terminals if Vcc is sufficiently high. A1 is an op-amp, the inputs of which receive the voltage appeared at one end of the resistor R4, and the voltage at one end of R5. The output current I of the op-amp A1 is at level at which the voltages applied to its inputs are equal. The bridge formed by the resistors R1, R2, R3, and Rs is in a proportion at default of R1R2=R3Rs, causing no current to outputs V1 and V2 to flow.

When the diaphragm 133 is stressed by the fluctuation of pressure, the piezoelectric element 135 changes its resistance in proportion to the pressure applied thereto, so that current will appear at outputs V1 and V2. In the semiconductor pressure sensor 130 shown in figure, this current is amplified by the amplifier 137 to convert to digital signal of an arbitrary number of bits by the A/D converter 138.

A graph indicating the relationship between the pressure and the output from the amplifier 137 when measuring the pressure as described above will be shown (c.f., Technical Notes on FUJIKURA semiconductor sensors).

Figure 6:
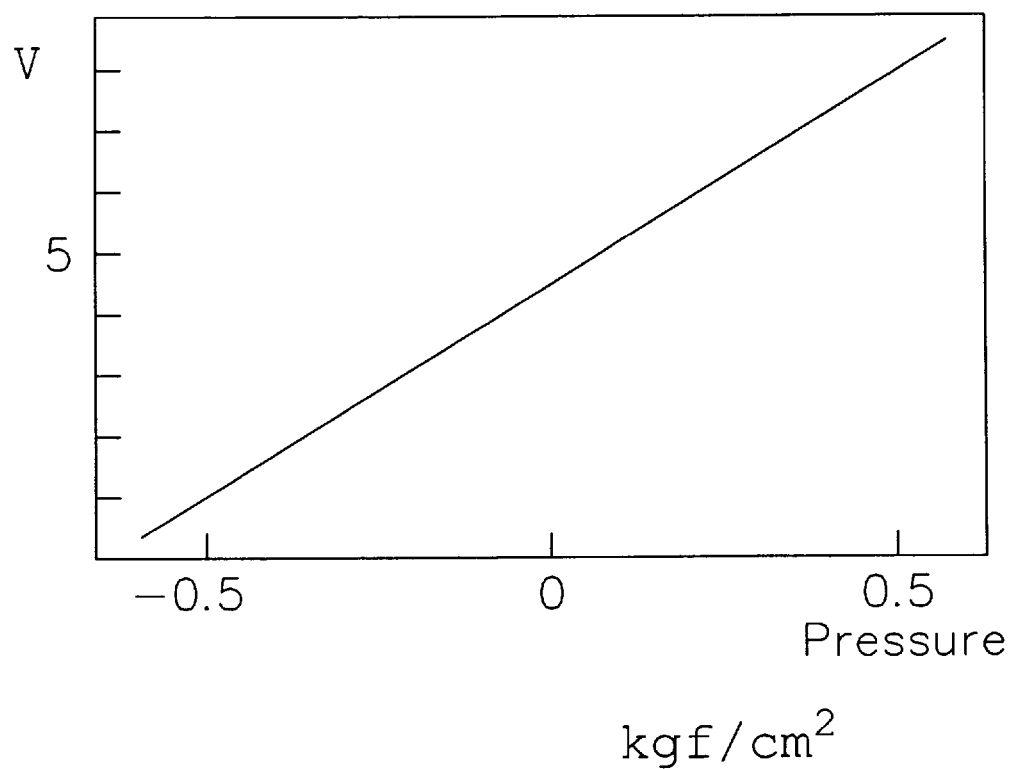
FIG. 6 is a graph indicating the relationship between the pressure and the output voltage of the amplifier 137.

FIG. 6 is a graph indicating the relationship between the pressure and the output from the amplifier 137.

As can be seen in the figure, the semiconductor pressure sensor 130 of FIG. 4 allows the measurement of pressure in a wide range of approximately 1 kgf/cm$^2$ (about 1 atm.). Actually there is no need to set the range of pressure measurement as wider as shown. Any narrower range may be selected to use when taking into account the airtightness and so on.

Figure 7:
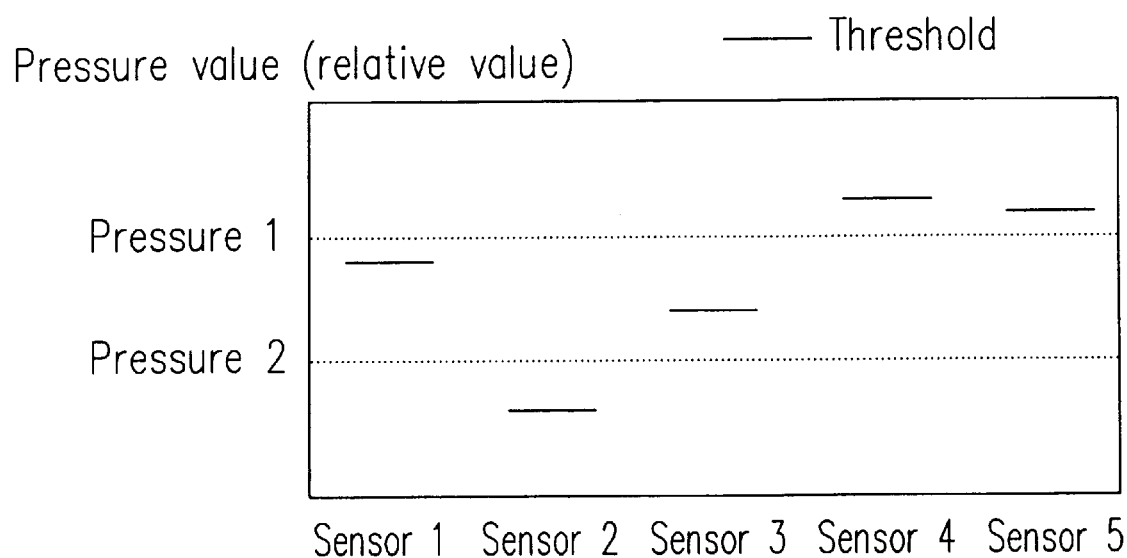
FIG. 7 is a schematic diagram depicting how to specify a code when five pressure sensor 130 are used as code generators for producing codes.

FIG. 7 is a schematic diagram depicting how to specify a code when five pressure sensor 130 are used as code generators for producing codes.

This figure indicates how codes changes according to the fluctuation of pressure (relative) value. There is set a different threshold value for each of respective sensor 1 to sensor 5 so as to output "1" if the measured pressure exceeds the threshold, and "0" if not.

Although in this example one threshold is set for each sensor for output of 1 bit code, the code output from respective sensor may be increased up to for example 8 bits by increasing the threshold assigned to each sensor. When five sensors are arranged as shown in the figure which output respectively a 8 bit code, a total of 40 bit code may be obtained, which has a sufficient complexity to withstand in practice.

A variety of sensors may be used, such as optic element, and piezoelectric element, or another electric element. The error in the pressure sensor is not important. Any sensor may output at least one bit, and the threshold from "0" to "1" or vice versa is sufficient to be scattered at each sensor. In general an A/D converter is used for converting analog signal from a pressure sensor into digital signal, however further complexity may be achieved by scattering the assignment of digital value to an analog value.

As have been described with reference to the flowchart, the cryptographic processing unit 120 of this embodiment according to the present invention generates an encryption key/decryption key each time encryption/decryption is carried out. Therefore the encryption key/decryption key thus generated will be the same each time, as long as there is no accident in the sealed space in the cryptographic processing unit 120. There may be the risk, however, of failure of generation of encryption keys/decryption keys, due to for example a temporary reason such as noise. In such a case it is sufficient to detect the presence of malfunction by setting a parity bit or the like for the secret data to regenerate the encryption keys/decryption keys.

As can be seen, the computer according to present invention, stores no encryption key/decryption key required for encrypting/decrypting secret data, and no code used for key generation. If a tamper (hereinafter, an invader) attempts to pierce a hole to the box (cell) of the cryptographic processing unit 120 or to disassemble, then the internal pressure in the cell 121 changes, so that the code generators 123a, 123b, . . . , 123n cannot output correct codes any more. Therefore encryption keys/decryption keys will not be generated correctly, and the invader has difficulty of obtaining correct encryption key/decryption key. This ensures that the leakage of secret data is prevented, even when the encrypted secret data stored in the memory circuit 112 is stolen.

The pressure sensors used as the code generator of the computer according to the present invention, do not generate correct codes if one cell 121 is damaged. This provides a very simple structure with sufficiently high protection without the need to arrange sensors on entire surface of protection container or form in such high density as in the prior art.

In addition, since in the computer according to the present invention, secret information such as encryption keys, decryption keys, and codes is generated as needed, any tamper detecting and deleting circuit for actively deleting secret information in the prior art are not required. Thus no additional power consumption is needed to apply to portable personal computers, and smart cards having no power supply built-in, and the like. For the same reason, there is not needed a tamper proof circuit (temperature sensor) against attack by putting the circuit into ultra very low temperature to stop operation to steal internal information.

In the computer according to present invention, if occasionally the value of encryption key/decryption key becomes abnormal due to noise and the like, the secret information contained in a memory is usable by regenerates an encryption key/decryption key after the problem has been solved. This ensures that the data is not destructed by any malfunction.

In the description above although a gas is used as an example of fluid to be encapsulated in the sealed space, this is not limitative. The fluid to be encapsulated include liquids or gels and the like, which changes its pressure or stress by a physical or chemical attack.

Second preferred embodiment of the first computer according to the present invention will be described below.

Figure 8:
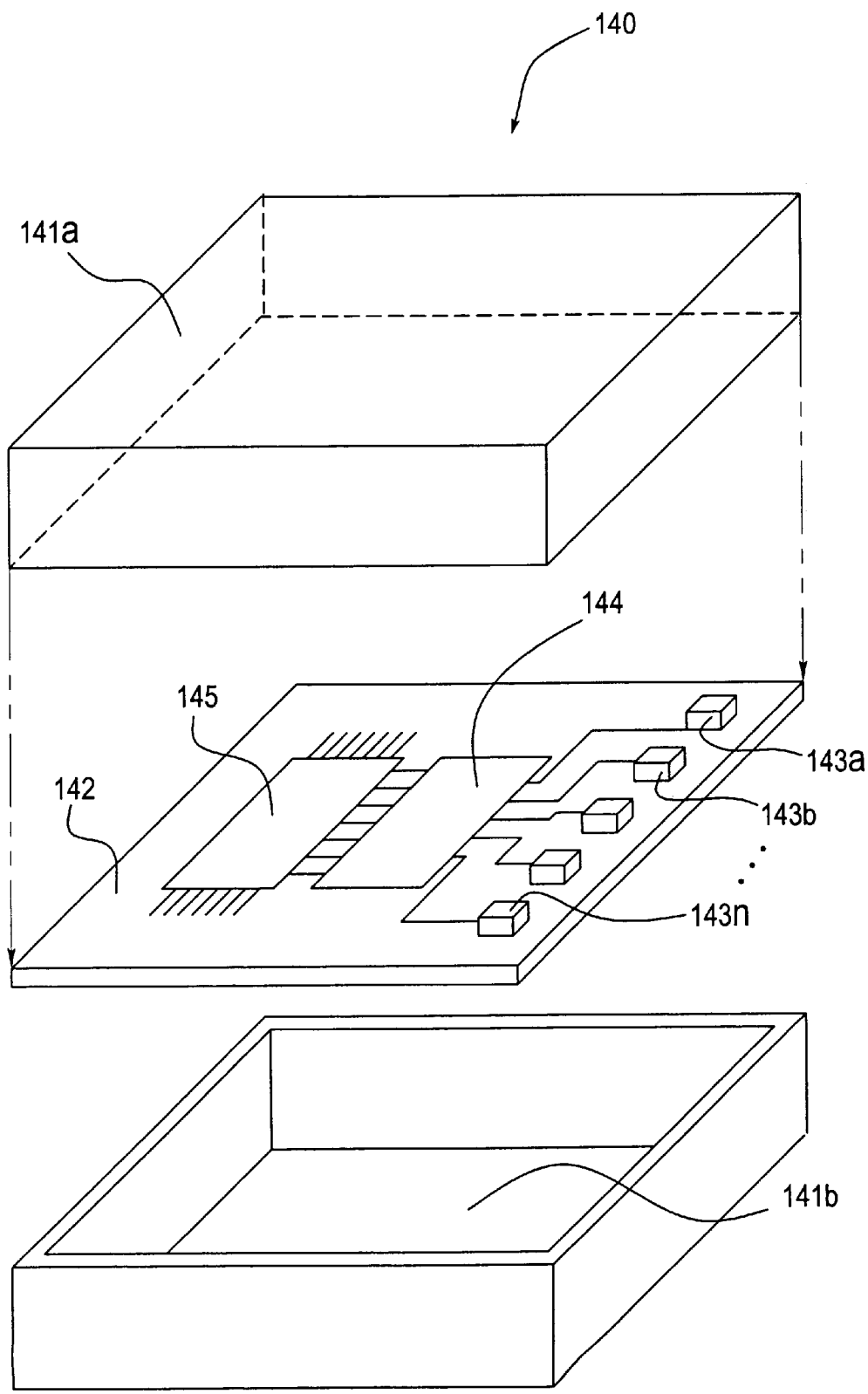
FIG. 8 shows a second preferred embodiment of first computer according to the present invention.

FIG. 8 shows a second preferred embodiment of first computer according to the present invention.

A cryptographic processing device 140 is comprised of cell 141a, and 141b sandwiching a substrate 142 which incorporates circuits in upper and lower surfaces, forming two sealed spaces therein. Here in the cells 141a and 141b a gas having chemical stability is encapsulated at an appropriate pressure, like the cell 121 shown in the first embodiment. The cells 141a and 141b are formed of material with excellent chemical/physical durability similar to the cell 121 in the first embodiment. When bonding the cells 141a and 141b with the substrate 142, any of methods with high bonding strength may be used, as similar to the first embodiment, in order to maintain high airtightness in the sealed space formed in the cryptographic processing unit 140.

On the top surface of the substrate 142, code generators 143a–143n, a key generator 144, and encryptor/decryptor 145 are mounted. On the bottom surface of the substrate 142, code generators 146a–146n (not shown) are mounted. The key generator 144 is connected to the encryptor/decryptor 145, code generators 143a–143n, and code generators 146a–146n.

In this embodiment, the code generators 143a–143n mounted on the top surface of the substrate 142, cooperate with the code generators 146a–146n mounted on the bottom of the substrate 142 to generate codes. The key generator 144 generates encryption keys/decryption keys specified by the all input codes. In the encryptor/decryptor 145 secret data will be encrypted/decrypted by using thus generated encryption keys/decryption keys.

In this embodiment, the code generators 143a–143n, 146a–146n, and cells 141a and 141b are mounted on both surface of the substrate 142 for prevent leakage of secret information against the intrusion from any direction.

Third preferred embodiment of the first computer according to the present invention will be described below.

Figure 9:
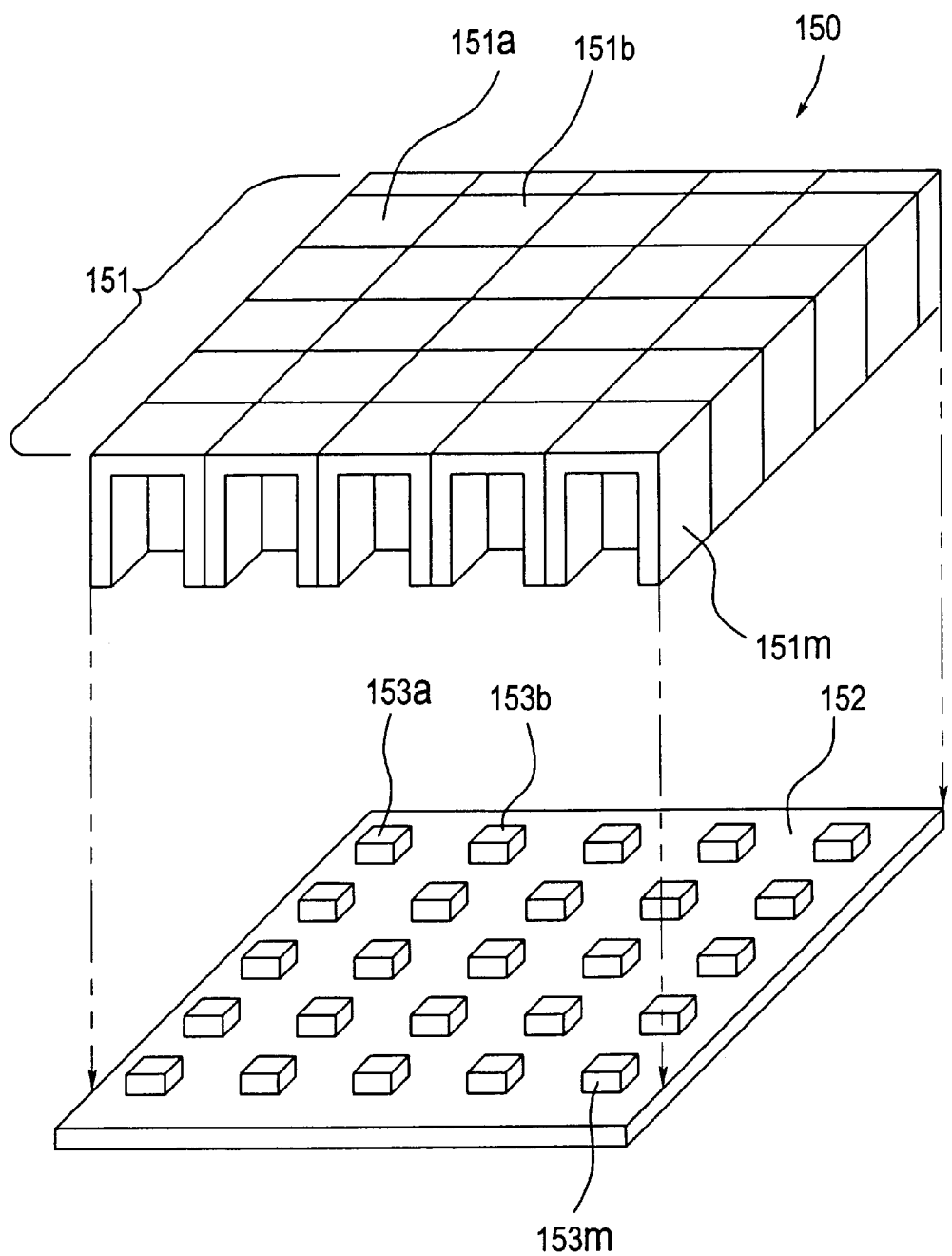
FIG. 9 shows a third preferred embodiment of the first computer according to the present invention.

FIG. 9 shows a third preferred embodiment of the first computer according to the present invention.

Secure data processing device 150 is comprised of cells 151a, 151b, ..., 151m, each partitioned as matrix, adhered to a substrate 152 for forming therein a plurality of sealed spaces. In the cells 151a, 151b, ..., 151m, inert gas such as helium and argon, or a gas having compatible chemical stability is encapsulated at a given pressure. The cells 151a, 151b, ... 151m may be formed of materials which is chemically/physically durable such as ceramics and metals. The pressure of the gas is not necessarily at a specific level, rather, it is preferable to be an appropriate random value (random number). When bonding cells 151a, 151b, ..., 151m with the substrate 152, any of methods with high strength such as laser welding, soldering which enables bonding at the atom level of materials, solid bonding, and the like, may be used for maintaining the high airtightness in a sealed space formed in the cryptographic processing unit 150.

On top of the substrate 152, code generators 152a, 153b, ..., 153m are mounted at the location corresponding to cells 151a, 151b, ..., 151m, respectively. When code generators are mounted on the whole surface area of the substrate 152 as in this preferred embodiment, the key generator and encryptor/decryptor are mounted where the code generator is not mounted on the substrate 152, or on lower surface (not shown).

The code generators 152a, 153b, ..., 153m generates codes specified by the gas pressure value of the gas encapsulated in the cells 151a, 151b, ..., 151m. The code generators in this preferred embodiment in encryption/decryption, takes the ratio of output values of code generators in adjacent cells to cause the key generator to use this ratio as code for generating encryption keys/decryption keys.

As the pressure value of gas may vary in proportion to temperature, it may be possible that the internal pressure of any cells vary due to local temperature fluctuation due to for example the heat from outside or from the mounted circuit. In this preferred embodiment, as described above, a plurality of cells and code generators are mounted at corresponding locations to generate security information required for encryption/decryption, by using the ratio of adjoining cells. If a pressure value changes, this will hardly affect the ratio of the pressure values of adjoining cells, which proportionally vary according to the change in temperature. This allows malfunction to be reduced, thus allowing reliability to be improved.

In the description above although a gas is used as an example of fluid to be encapsulated in the sealed space, this is not limitative. The fluid to be encapsulated include liquids or gels and the like, which changes its pressure or stress by a physical or chemical attack.

Code generators applicable to the cryptographic processing unit 150 include the semiconductor pressure sensor 130 shown in FIG. 4. However, pressure sensors of any other types may be used. Some examples of pressure sensors applicable to the computer according to the present invention will be described in greater details, in structure and operation.

Figure 10:
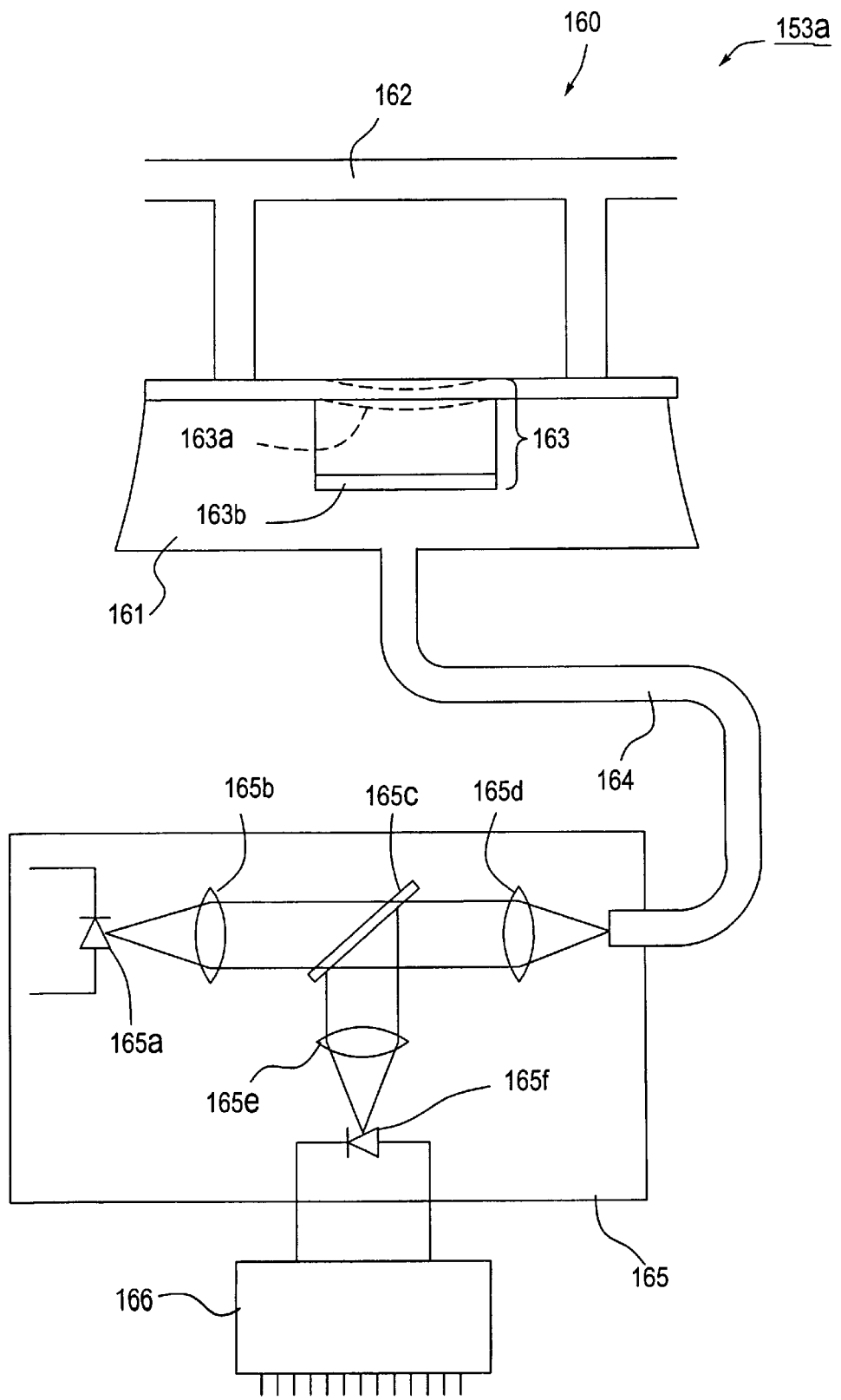
FIG. 10 is a second embodiment of code generators.

FIG. 10 is a second embodiment of code generators.

Here first pressure detecting system 160 is embodied as code generators. The structure of code generators 153b, ..., 153m may be the same as the code generator 153a.

In this figure, the first pressure detecting system 160 is formed of a substrate 161 and cell 162 adhered thereto. The cell 162 encapsulates a gas at an appropriate pressure, and the substrate 161 includes a resonator 163 for detecting the internal pressure of the cell 162. The resonator 163 is an interferometer formed of reflectors 163a and 163b, one of the reflectors 163b holding an end of optic fiber 164. The reflector 163a is held in parallel, in normal operation, by the pressure of the gas in the cell 162. At the other end of the optic fiber 164 a pressure detector 165 is attached. The pressure detector 165 comprises a semiconductor laser 165a, a lens 165b, beam splitter 165c, another lenses 165d, 165e, and a photodiode 165f, and is connected to the optic fiber 164 through the lens 165d. The output from the photodiode 165f is entered into an A/D converter 166, which outputs digital values to be input into the key generator as codes.

How to output codes in the first pressure detecting system 160 of such a structure will be described below.

Figure 11:
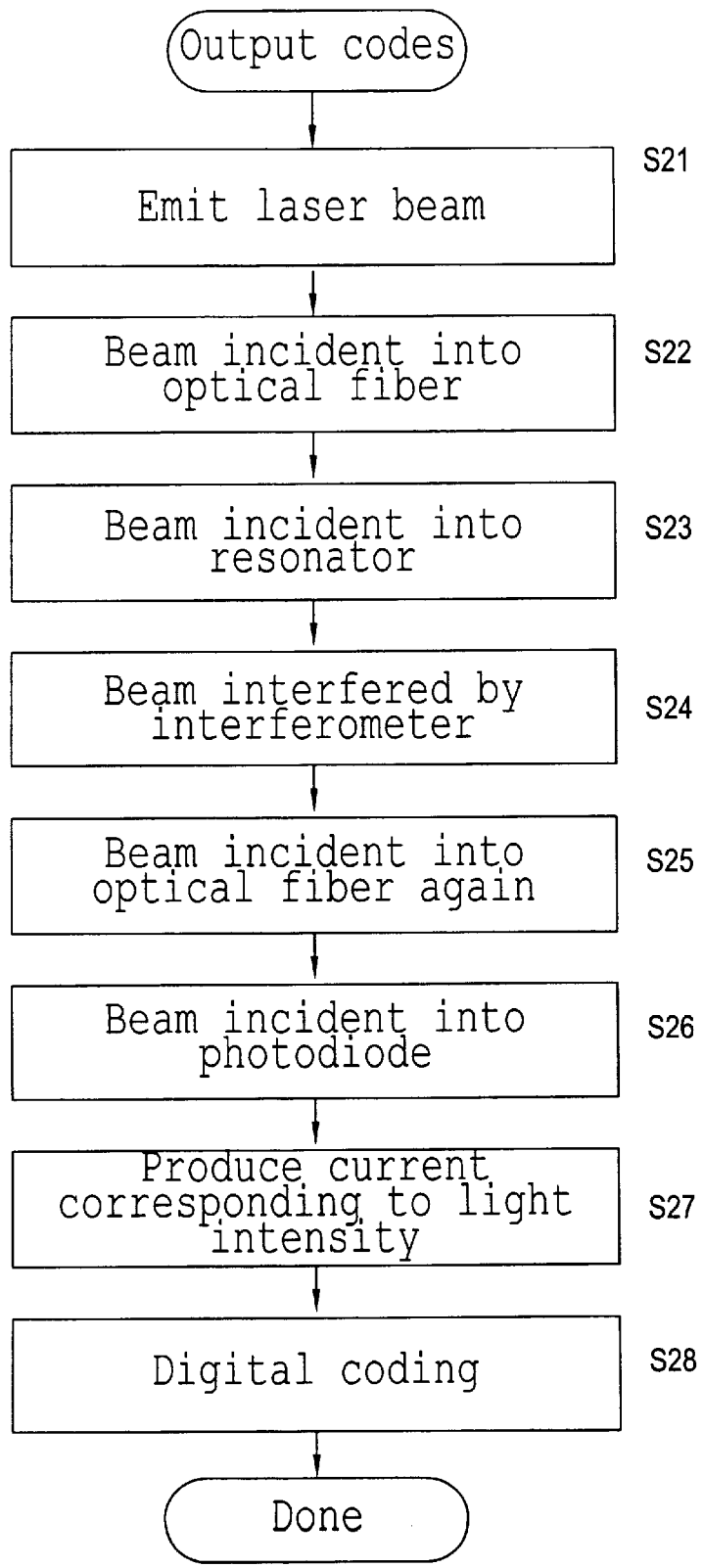
FIG. 11 is a flowchart illustrating how to output codes by using the first pressure detecting system 160 shown in FIG. 10.

FIG. 11 is a flowchart illustrating how to output codes by using the first pressure detecting system 160 shown in FIG. 10.

The semiconductor laser 165a of the pressure detector 165 upon receipt of a code generation request, emits laser beam (step S21). The beam emitted passes through the lens 165b, beam splitter 165c, lens 165d in sequence to be incident into the optic fiber 164 (step S22). The beam passing through the optic fiber 164 is incident into the resonator 163 (step S23), then interfered by the interferometer formed by the reflectors 163a and 163b (step S24). The beam acquires a corresponding intensity with respect to the gap between the reflectors 163a and 163b, and thereafter is incident into the optic fiber 164 (step S25). The beam returned into the pressure detector 165 through the optic fiber 164 passes through, in the reverse order, the lens 165d, beam splitter 165c, lens 165e to the photodiode 165f (step S26). The photodiode 165f produces a current corresponding to the intensity of the beam incident thereto (step S27) to be input to the A/D converter 166. The A/D converter 166 converts analog current input into digital codes (step S28) and outputs the codes.

As can be seen, in this first pressure detecting system 160, the change in the pressure value of gas in the cell 162 causes the deformation of the reflector 163a. Therefore it will not be possible to generate codes correctly because if any attempt to attack the cell 162 by an invader causes an anomaly, the abnormal changes in intensity of beam propagates.

When the first pressure detecting system 160 is applied to the cryptographic processing unit 150 according to the present invention as shown in FIG. 9, the cell 151 and substrate 152 in FIG. 9 correspond to the cell 162 and substrate 161 in FIG. 10, respectively.

Figure 12:
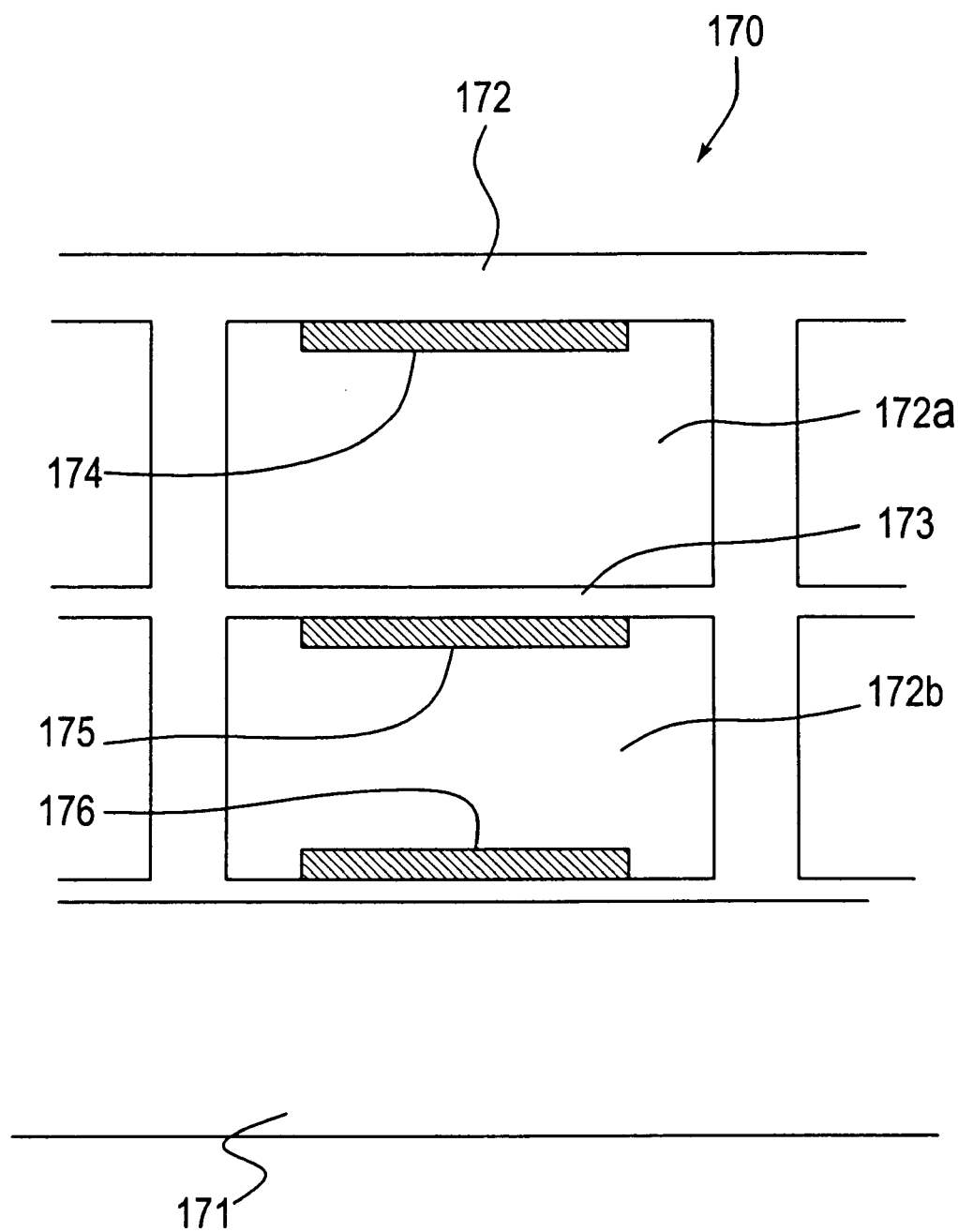
FIG. 12 is a third embodiment of code generators.

FIG. 12 is a third embodiment of code generators.

Here an example of second pressure detecting system 170 will be described as code generators.

In this figure, the second pressure detecting system 170 is comprised of a substrate 171, and cell 172 having two sealed spaces 172a, 172b adhered thereto. Two sealed spaces 172a and 172b of the cell 172 are separated by a diaphragm 173, for encapsulating gas of different pressure. An electrode 174 on the upper sidewall in a sealed space 172a, an electrode 175 on the upper sidewall in another sealed space 172b, an electrode 176 on the lower sidewall in the sealed space 172b, are mounted. The electrodes 174 and 175 have capacitance A, the electrodes 75 and 176 have capacitance B respectively. The gap between the electrode 174 and 175, and the gap between the electrode 175 and 176 may be determined by the pressure ratio in the sealed space 172a and 172b, thus the capacitance A and B also are determined. The second pressure detecting system 170, other than the structure shown, comprises voltage generator for retrieving the capacitance ratio to convert into voltage, and A/D converter and the like.

In the second pressure detecting system 170 of such a structure, the capacitance ratio between A and B are retrieved for converting into voltage. Thus obtained voltage will be digitally coded at the A/D converter for input into the key generator.

The pressure ratio in sealed spaces 172a and 172b may not vary by the changes in temperature. However in case of an attempt of attack, the diaphragm 173 deforms so that the pressure changes. If any anomalies happen other than temperature changes, correct codes no longer are generated so that the secret information may be protected.

When the second pressure detecting system 170 is applied to the cryptographic processing unit 150 according to the present invention as shown in FIG. 9, the cell 151 and substrate 152 in FIG. 9 correspond to the cell 172 and substrate 171 in FIG. 12, respectively.

Figure 13:
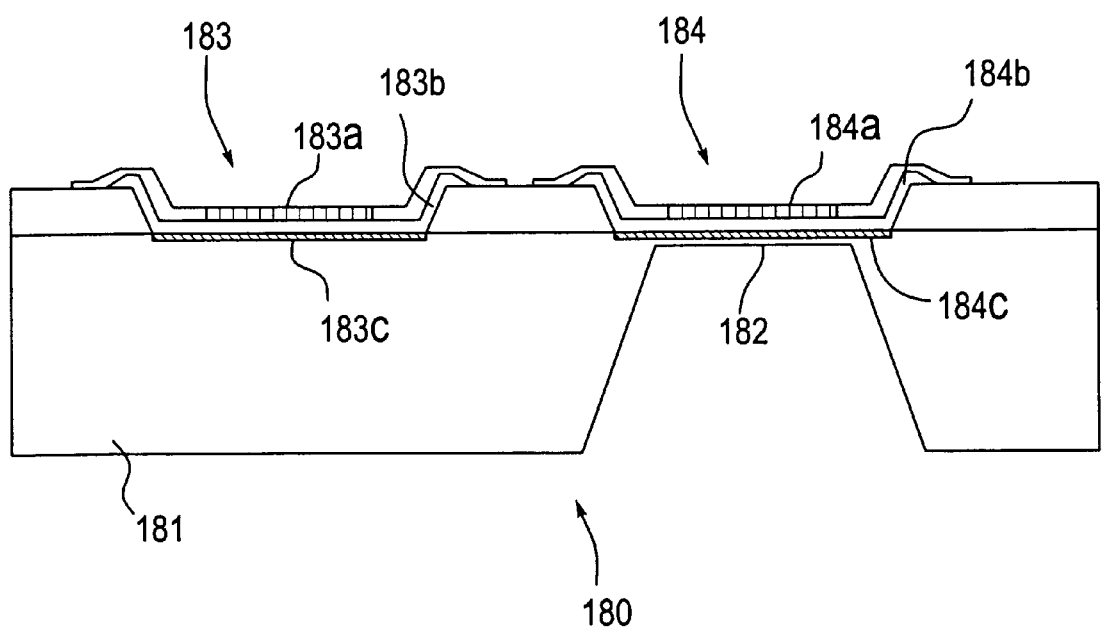
FIG. 13 is a sectional view showing the principle of a pressure sensor using diaphragm.

FIG. 13 is a sectional view showing the principle of a pressure sensor using diaphragm (c.f., Journal of Microelecromechanical Systems, pp 98–105, vol. 5, No. 2, June 1996).

A pressure sensor 180 manufactured by a micromachining technique comprises a substrate 181 having a diaphragm 182, two capacitors 183 and 184. In the figure the pressure sensor 180 is stressed from the upper and lower directions in the figure. A capacitor 183 is formed on the substrate 181 of an electrode 183a made of polysilicon, a dielectric 183b of oxide film, another electrode 183c of arsenic diffusion. The capacitor 184 is formed of, as similar to the capacitor 183, an electrode 184a of polysilicon, a dielectric 184b and another electrode 184c formed of arsenic diffusion. When the pressure sensor 180 is used for a code generator, differential circuit and voltage generator, A/D converter and the like are also to be used in addition to the components shown.

The pressure sensor 180 of such a structure retrieves the difference of the capacitance of capacitor 184 from the capacitance of capacitor 183 as reference. The difference is converted to a voltage, which in turn A/D converted to digital codes.

In case of an attempt of attack, the diaphragm 182 deforms so that the pressure changes, resulting in that correct codes no longer be generated. Thus secret information may be protect against tampering.

According to the reference as cited above, observation results have been demonstrated that, when taking the capacitor 183 as reference which is mounted in a position not affected by the diaphragm 182, the capacitance difference from the capacitor 184 mounted on the diaphragm 182 is not affected by the influences such as change in environmental condition or the heat of substrate 181.

Figure 14:
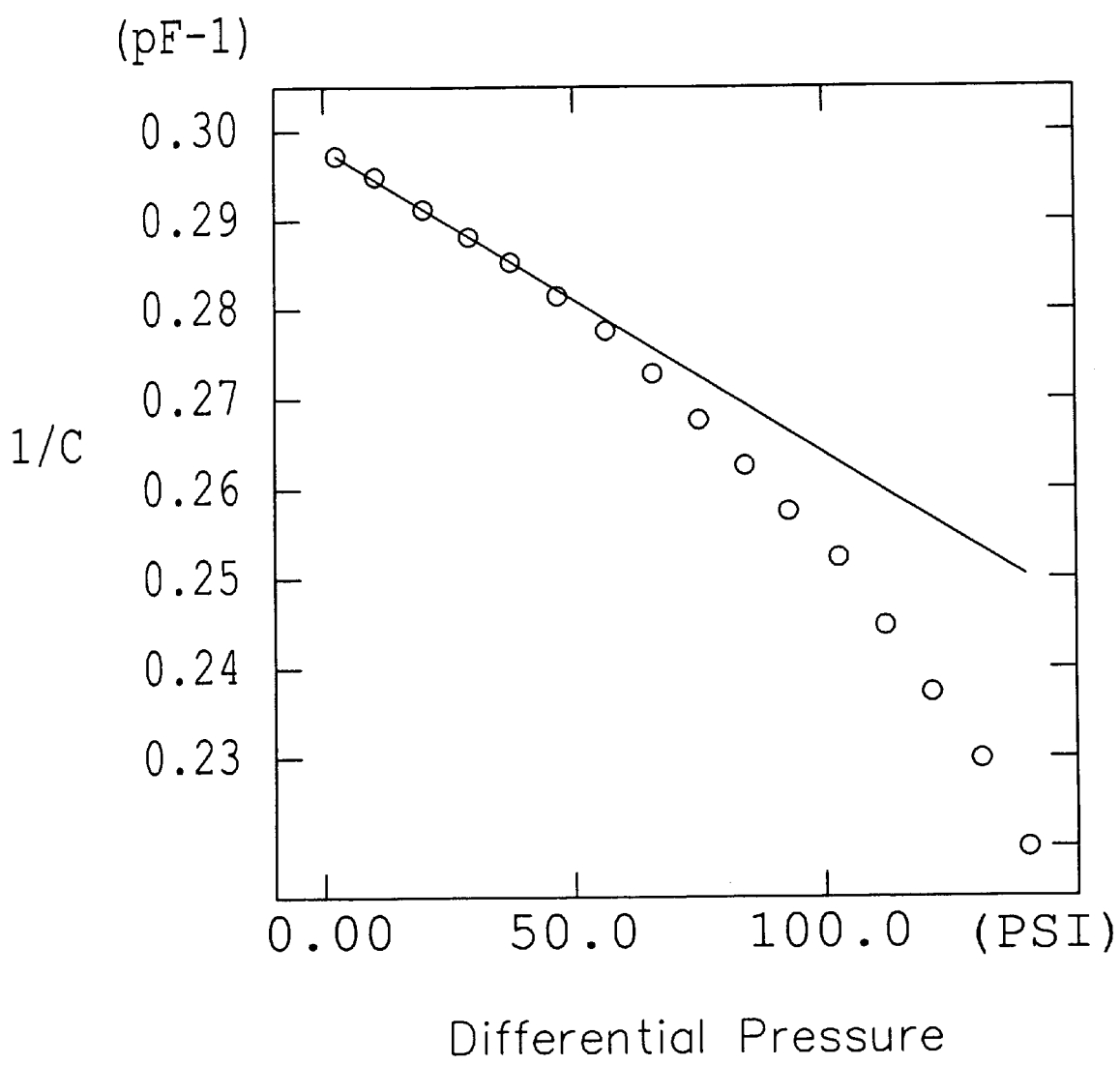
FIG. 14 is a graph showing the influence on the capacitor's capacitance value of the change of the difference of pressure in top and bottom of the pressure sensor 180 shown in FIG. 13.

FIG. 14 is a graph showing the influence of the change of the difference of pressure in top and bottom of the pressure sensor 180 shown in FIG. 13 (c.f., Journal of Microelecromechanical Systems, pp 98–105, vol. 5, No. 2, June 1996).

Fourth preferred embodiment of the first computer according to the present invention will be described below.

Figure 15:
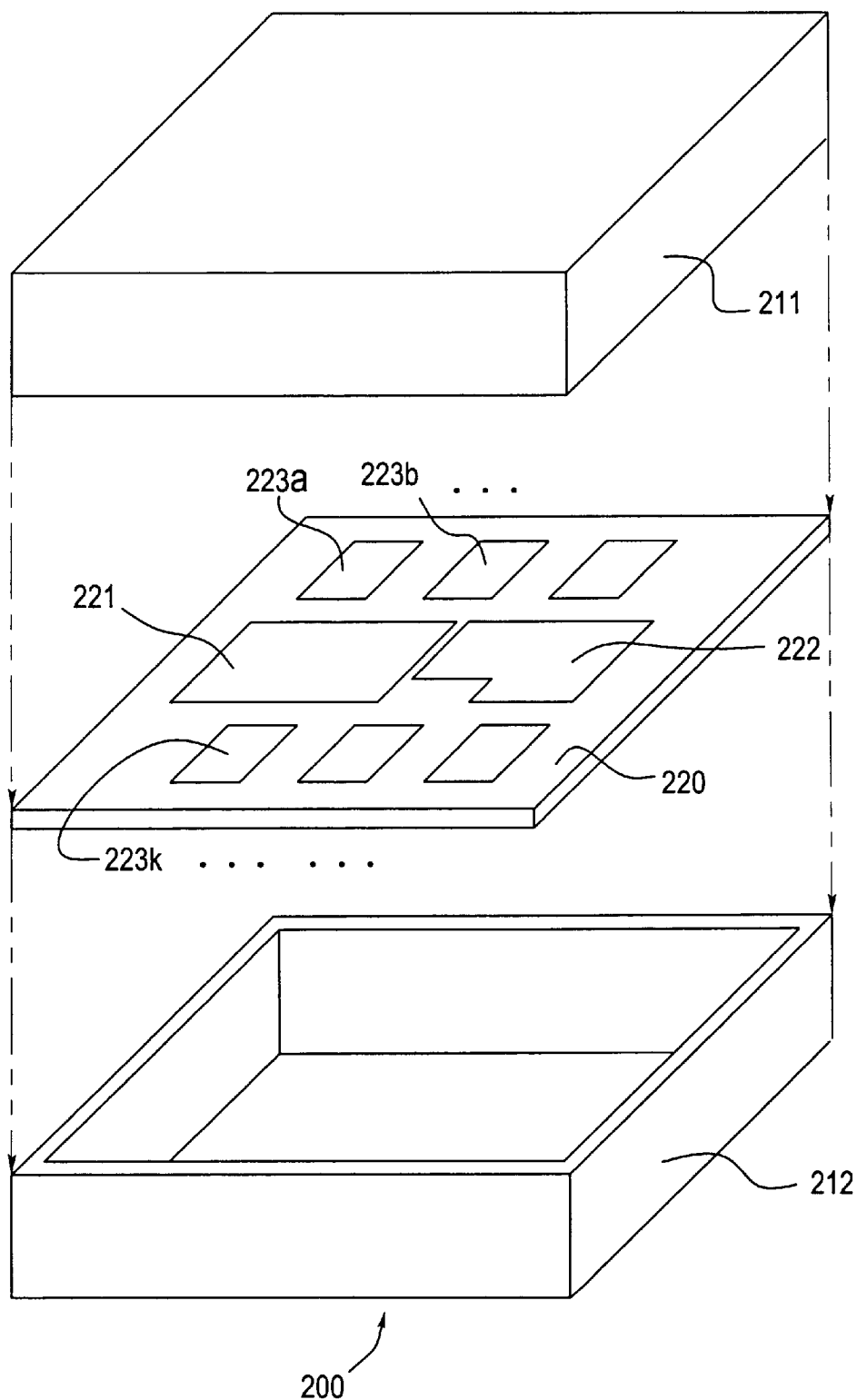
FIG. 15 shows a fourth preferred embodiment of the first computer according to the present invention.

FIG. 15 shows a fourth preferred embodiment of the first computer according to the present invention.

A cryptographic processing unit 200 comprises a cell 211, a substrate 220, and a cell 212 adhered together, forming thereby two sealed spaces therein. The cell 211 and the cell 212 sandwich the substrate 220 such that they hold it by top and bottom in the figure. Their respective sealed spaces are completely separated by the substrate 220. Here, in the cells 211 and 212, inert gas such as helium and argon, or a gas having compatible chemical stability is encapsulated at a given different pressure. The cells 211 and 212 may be formed of materials which is chemically/physically durable such as ceramics and metals. When joining the cells 211 and 212 with the substrate 220, any of methods with high strength such as laser welding, soldering which enables bonding at the atom level of materials, solid bonding, and the like, may be used for maintaining the high airtightness in a sealed space formed in the cryptographic processing unit 200.

On the substrate 220 a arithmetic circuit 221, a memory circuit 222, as well as the code generators 223a, 223b, ..., 223k are mounted together with key generator and encryptor/decryptor to form a computer.

In this preferred embodiment, the code generators 223a, 223b, ..., 223k uses a pressure sensor which produces codes corresponding to the ratio of pressure between two cells. For example, if for the code generator 223a, pressure sensors are disposed onto both two cells and a circuit is further provided which computes the ratio of the output from these pressure sensors, codes corresponding to the pressure ratio may be resulted. Here the code generators 223b, ..., 223k may be of the same structure as the 223a.

Fifth preferred embodiment of the first computer according to the present invention will be described below.

Figure 16:
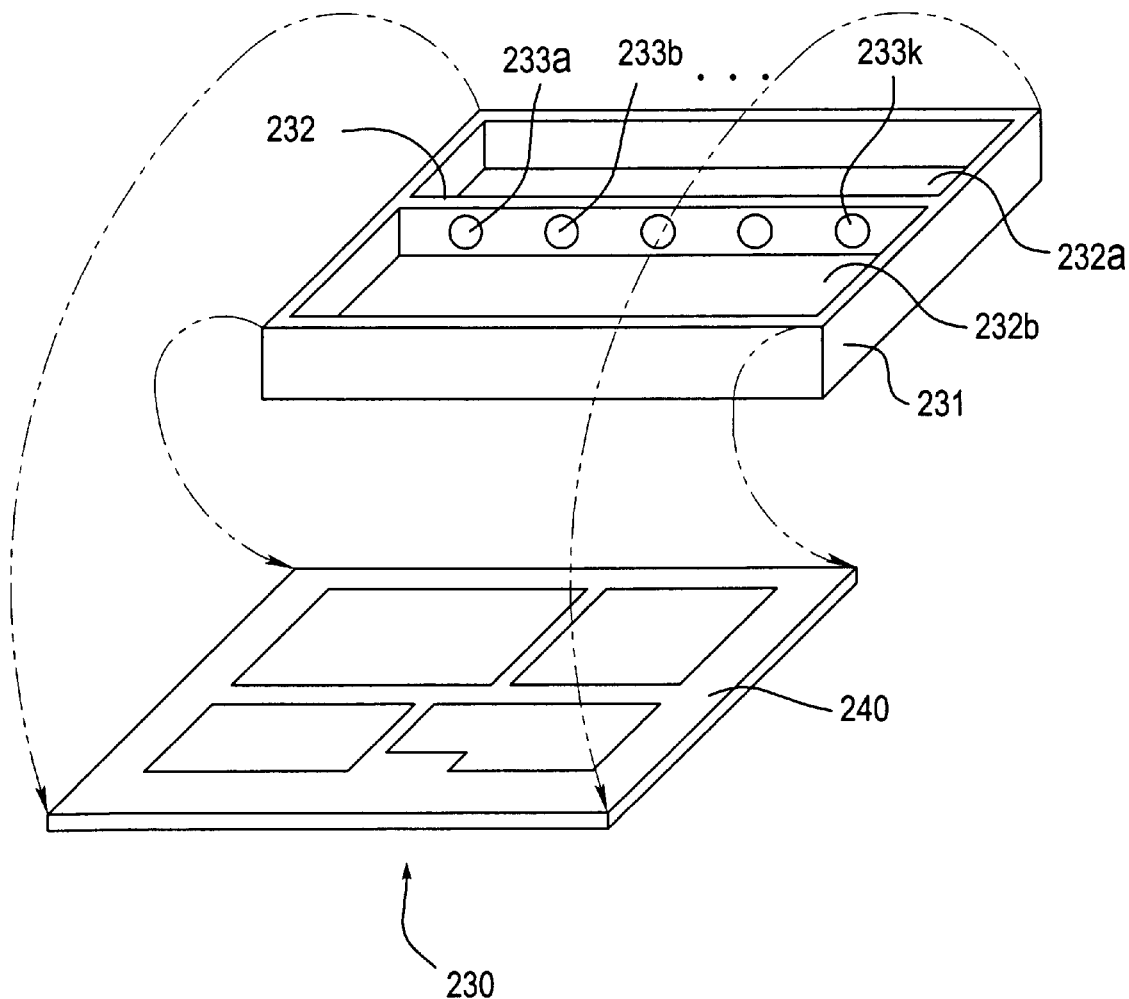
FIG. 16 shows a fifth preferred embodiment of the first computer according to the present invention.

FIG. 16 shows a fifth preferred embodiment of the first computer according to the present invention.

A secret data processor 230 is formed of a cell 231 having therein a separator 232 adhered to a substrate 240, forming two sealed spaces 232a and 232b. In sealed spaces 232a and 232b, inert gas such as helium and argon, or a gas having compatible chemical stability is encapsulated at different pressure. The cell 231 may be formed of materials which is chemically/physically durable such as ceramics and metals. When bonding the cell 231 to the substrate 240, any of methods with high strength such as laser welding, soldering which enables bonding at the atom level of materials, solid bonding, and the like, may be used for maintaining the high airtightness in two sealed spaces formed in the cryptographic processing unit 230.

Any number of code generators 233a, 233b, ..., 233k are embedded into the separator 232. These code generators 233a–233k generate codes corresponding to the pressure ratio of the gas encapsulated in two sealed spaces, as similar to the fourth preferred embodiment shown in FIG. 15. On the substrate 240 key generators which generates encryption key/decryption key from the generated codes, and the encryptor/decryptor using these encryption key/decryption key to encrypt and decrypt the secret data. This cryptographic processing unit 230 forms a computer unit together with a not shown processor and memory circuits.

For encryption/decryption of secret data, an encryption key/decryption key specified by the codes output from the code generators 233a–233k is generated, and the encryption key/decryption key is used for actual processing. The encryption key/decryption key generated will be identical as long as the pressure ratio between sealed spaces 232a and 232b is not abnormal.

As can be seen, when a code generator is used which generates codes corresponding to the pressure ratio between a plurality of sealed spaces, it is not necessary to mount the code generator on the substrate, thereby the unit will not be affected by the change in temperature. In the embodiment above, a cell is partitioned into two separated sealed spaces, it is possible to increase the number of separators to increase the number of sealed chambers to make more code generators to generate more complex codes.

An example of a computer applicable to a smart card, which generates codes specified by codes from the pressure of the fluid in a cell to process (encryption/decryption) the secret data will be described below.

Figure 17:
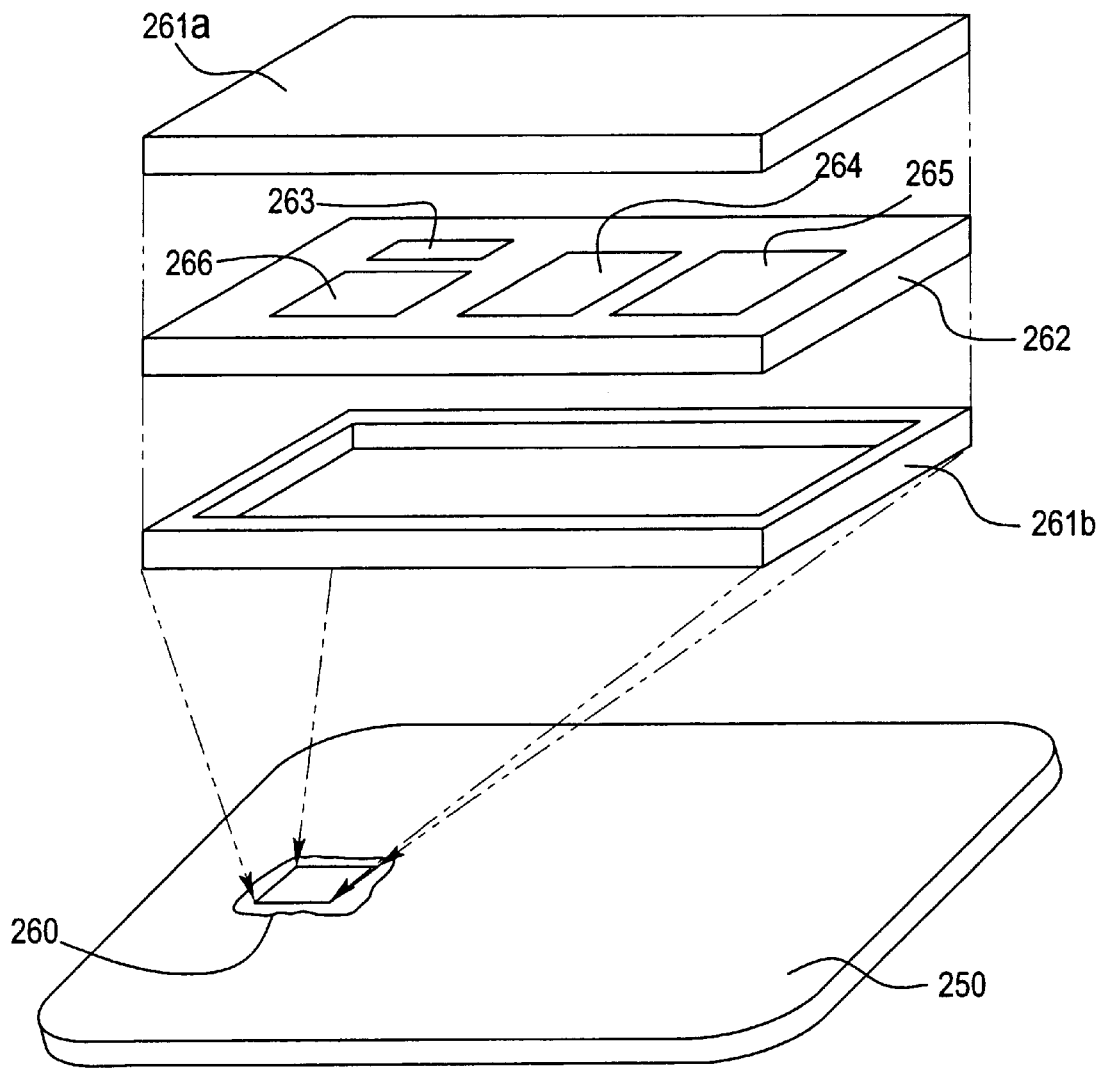
FIG. 17 is a schematic diagram of a first computer specifying codes from the fluid pressure data, which is applicable to a smart card, according to the present invention.

FIG. 17 is a schematic diagram of a first computer specifying codes from the fluid pressure data, which is applicable to a smart card, according to the present invention.

In FIG. 17, the smart card 250 comprises an IC chip 260 together with other mechanism. The IC chip 260 is one chip computer according to the present invention, which is formed of a cell 261a, and 261b holding a substrate 262 between them, enclosing two sealed spaces therein. In these two sealed spaces, inert gas such as helium and argon, or a gas having compatible chemical stability is encapsulated at a given different pressure. The cells 261a and 261b are formed of materials which is chemically/physically durable such as ceramics and metals. When bonding cells 261a, 261b with the substrate 262, any of methods with high strength such as laser welding, soldering which enables bonding at the atom level of materials, solid bonding, and the like, may be used for maintaining the high airtightness in sealed spaces formed in the IC chip 260.

The substrate 262 comprises a pressure sensor 263 using any of measurement method of the pressure in the two sealed spaces. On the substrate 262, a key generator for generating encryption keys/decryption keys specified by the code output from the pressure sensor 263, and an encryptor/decryptor for encrypting/decrypting the secret data by using thus generated encryption keys/decryption keys are also integratid. An arithmetic circuit 264, a memory circuit 265, a communication circuit 266 for communicating with external devices are also integrated on the substrate 262, allowing contactless data communication to be enabled.

The secret data processed in the arithmetic circuit 264 is encrypted based on the code output from the pressure sensor 263 and the encrypted secret data is stored in the memory circuit 265. The encrypted secret data stored in the memory circuit 265 is decrypted based on the code output from the sensor 263 to process in the arithmetic circuit 264 to restore secret data.

These secret data and encrypted secret data may be input and output from/to external devices through the communication circuit 266.

By embedding such an IC chip 260 into a smart card 250, if an invader attempts to pirate the secret data or secret information, he or she damages the cell 261a or 261b. Thus the gas pressure in sealed spaces varies so that correct codes no longer be available, resulting in that the information is prevented from tampering.

As described above, in the computer according to the present invention, a code is generated each time secret data is encrypted/decrypted, and both codes and encryption keys/decryption keys are not statically stored. Any invader may input no decryption key even when the encrypted secret data has been stolen, correct reading out may not be achieved.

Since secret information such as encryption key, decryption key, and codes are not statically stored, neither attack detector circuit nor deleting circuit for erasing secret information are required, so that power supply to these circuits no longer is needed. This allows smart cards without battery and portable information devices which requires power consumption as small as possible to be applied.

Since no secret information is statically stored, no information will be lost even when a malfunction of sensors happens. Thus, in an environment where sensors may or may not malfunction, no secret data will be lost, and the present invention may be applicable to any portable devices which are subject to be exposed to environmental change.

In the above description, a gas is primarily assumed to be the fluid to be encapsulated in the sealed space. The fluid may not be limited to gas, rather, it may be what changes the pressure value by a damage of cell.

Sixth preferred embodiment of the first computer according to the present invention will be described below.

Figure 18:
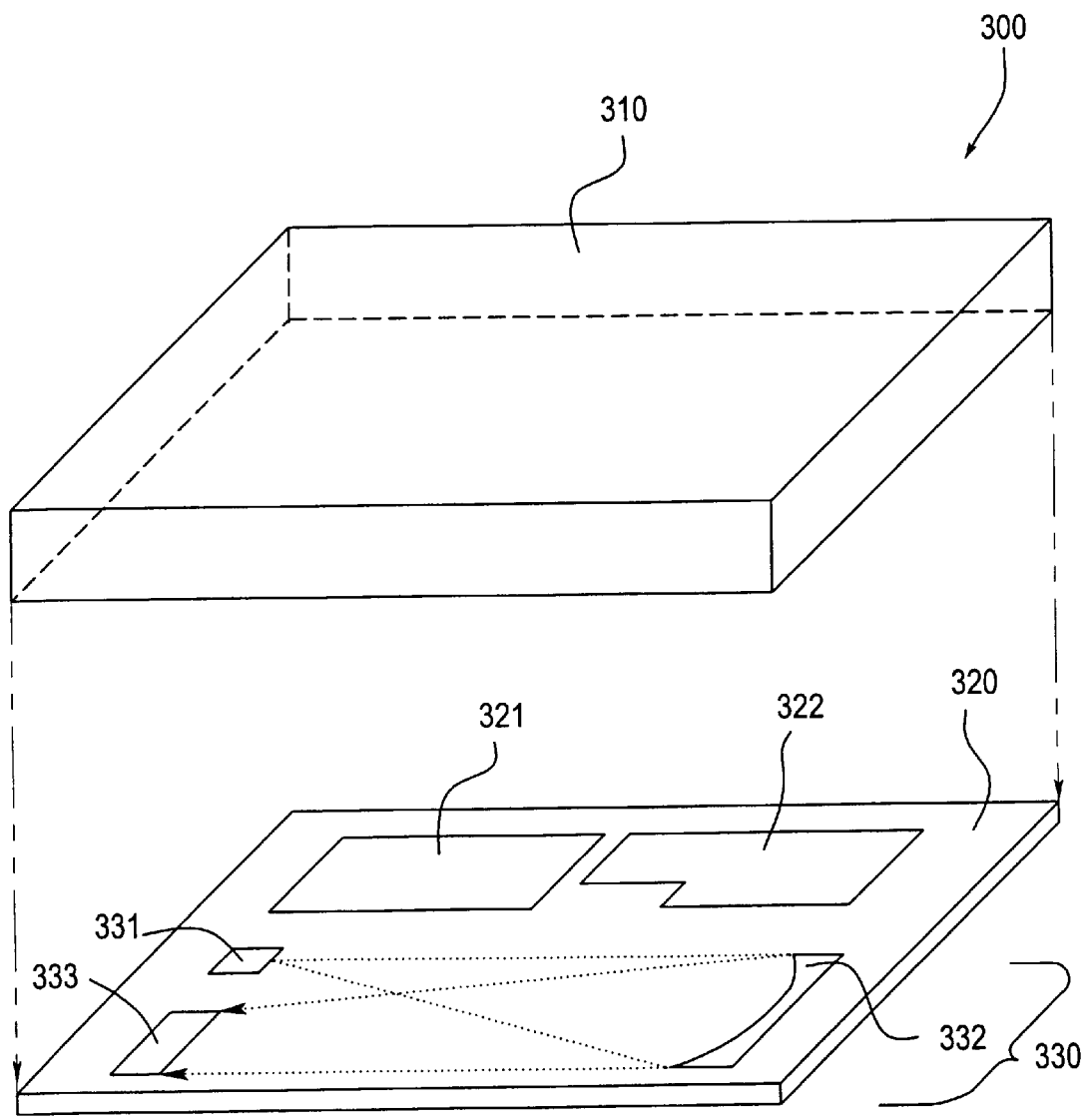
FIG. 18 shows a sixth preferred embodiment of the first computer according to the present invention.

FIG. 18 shows a sixth preferred embodiment of the first computer according to the present invention.

A cryptographic processing unit 300 comprises a cell 310 adhered to a substrate 320, forming thereby a sealed space therein. In the cell 310 a mixture of gases at a specific ratio of component gas is enclosed. The cell 310 may be formed of materials which is chemically/physically durable such as ceramics and metals. When bonding the cell 310 to the substrate 320, any of methods with high strength such as laser welding, soldering which enables bonding at the atom level of materials, solid bonding, and the like, may be used for maintaining the high airtightness in a sealed space formed in the cryptographic processing unit 300.

The substrate 320 comprises a key generator 321, an encryptor/decryptor 322, a code generator 330 generating code based on the ingredient information of the gas, and these components together with a not shown processor and memory forms the computer unit. The code generator 330 is comprised of an LED 331, diffraction grating 332, an array of photodiodes 333, an A/D converter and the like.

When the code generator 330 generates codes, light beam is initially emitted from the LED 331. The beam passes through the gas in the sealed space formed of the cell 310 and substrate 320, then diffracted by the grating 332. The diffraction passes again through the gas in the sealed space and then is incident into the array of photodiodes 333. The photodiode array 333 detects by splitting the incident beam into wavelength bands, to obtain a voltage pattern changing according to the ingredient information of the gas. Thus obtained voltage pattern is digitized by the A/D converter to input to the key generator 321.

The light beam emitted from the LED 331 may be absorbed or refracted when passing through the sealed space formed by the cell 310 and the substrate 320, the amount of absorption or refraction varies according to the ingredient ratio of the gas. If the ingredient ratio of the gas changes due to the attack, the voltage pattern detected by the photodiode array 333 eventually changes, so that no correct code will be output.

There are LEDs for wavelength range of 500 nm to 1000 nm or more which are commercially available for use in the LED 331. Any of these LEDs may be used. The ingredient ratio of the gas mixture enclosed in the sealed space should have absorption lines in that range. For example, pure Ar gas has absorptions with relatively large transition such as 415.86, 425.94, 763.51, 794.82, 811.53 nms in a range of 400–900 nm. There are many absorptions in the He and Xe gases. Other than rare gases, some molecular gases are confirmed to have many absorptions in there absorption range. This an appropriate mixture of these gases is sufficient for enclosing in the sealed space. As, instead of the components of the gas, the mixture ratio data is used, oxygen or nitrogen in the open air may be encapsulated. By shielding parallel plates, an appropriate absorption rate may be come available, for some absorption lines with low coefficient.

Seventh preferred embodiment of the first computer according to the present invention will be described below.

Figure 19:
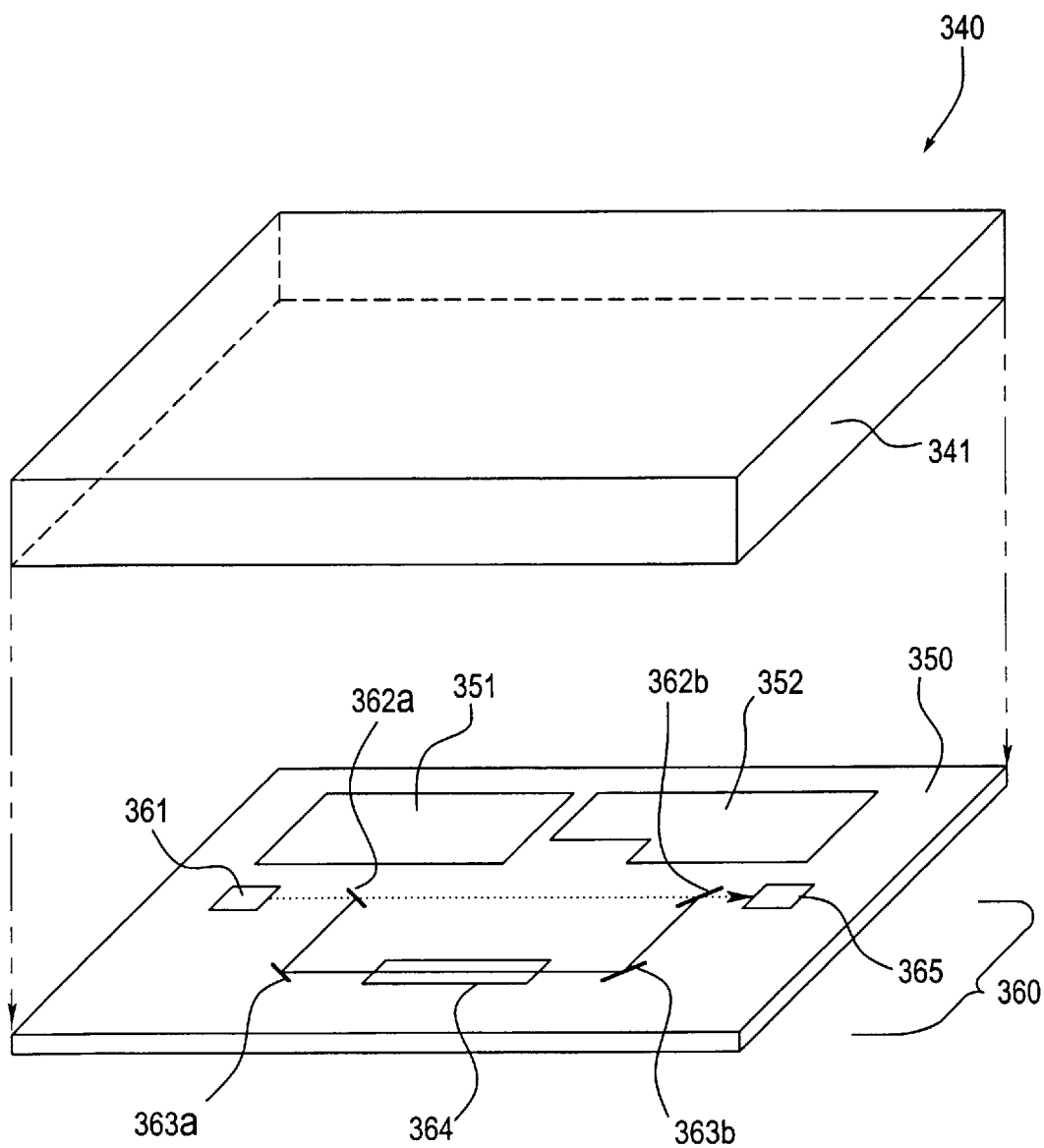
FIG. 19 shows a seventh preferred embodiment of the first computer according to the present invention.

FIG. 19 shows a seventh preferred embodiment of the first computer according to the present invention.

A cryptographic processing unit 340 is formed a cell 341 adhered to a substrate 350, forming a sealed space therein. In the cell 341 a mixture of gases at a specific ratio of component gas is enclosed. The cell 341 may be formed of materials which is chemically/physically durable such as ceramics and metals. When bonding the cell 341 to the substrate 350, any of methods with high strength such as laser welding, soldering which enables bonding at the atom level of materials, solid bonding, and the like, may be used for maintaining the high airtightness in a sealed space formed in the secret data processing unit 340.

On the substrate 350 a key generator 351, an encryptor/decryptor 352, a code generator 360 generating codes from the ingredient information of the gas are mounted to form the computer unit together with a processor and memory, although not shown. The code generator 360 is comprised of a laser diode 361, a beam splitter 362a, 362b, a reflector 363a, 363b, a waveguide 364, a photodiode 365, an A/D converter and the like.

When generating codes by the code generator 360, initially the laser diode 361 emits light beam. The beam emitted is split by the beam splitter 362a into two beams, the one passing through the gas in the sealed space formed by the cell 341 and the substrate 350, the other passes through sequentially the reflector 363a, waveguide 364, and reflector 363b. Thereafter, the two beams are synthesized by the beam splitter 362b into one single beam to be detected by the photodiode 365. In the detected bean difference of phase due to the difference of length of these two light paths is present, resulting in change corresponding to the gas ingredient in the light intensity detected by the photodiode 365. Then a voltage pattern obtained from the light intensity detected by the photodiode 365 is digitized by an A/D converter to input to the key generator 351.

Beam passing along with a light path in the sealed space may reflects at a ratio corresponding to the ingredient ratio of the gas encapsulated therein. Thus, if the ingredient ratio of the gas changes due to the attack, the voltage pattern detected by the photodiode 365 eventually changes, so that no correct code will be output.

An example of computer unit for processing (encryption/decryption) secret data by generating keys by obtaining key codes from optical characteristics based on the ingredient ratio of the fluid in the cell will be described below which is applicable to a smart card.

Figure 20:
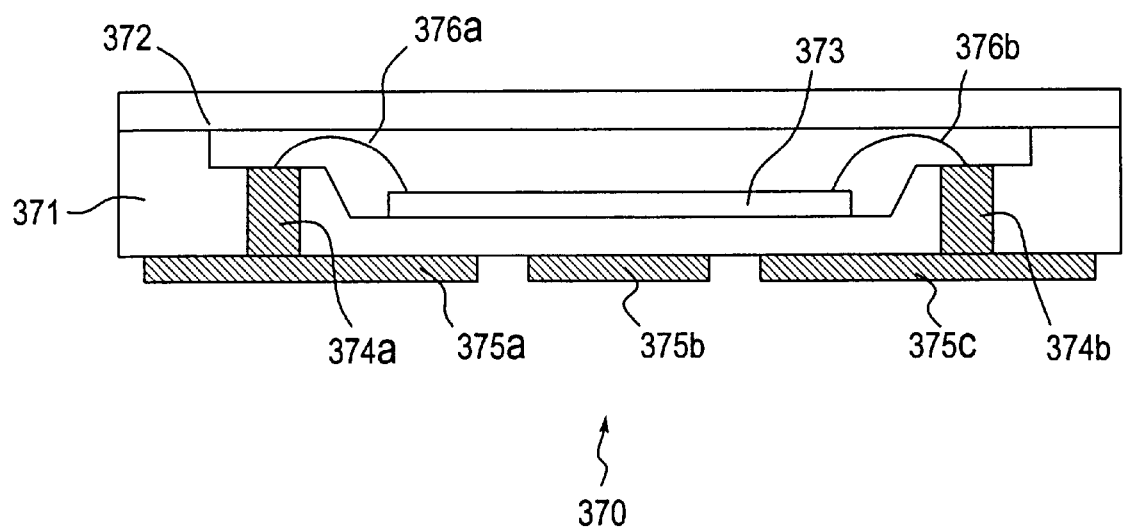
FIG. 20 is a sectional view of the first computer according to the present invention, which specifies a code based on the characteristics of fluid, and is applied to a smart card.

FIG. 20 is a sectional view of the first computer according to the present invention, which specifies a code based on the characteristics of fluid, and is applied to a smart card.

In FIG. 20, an IC chip module 370 to be inserted in a smart card is formed of lower case 371 adhered to the counterpart upper case 372. In this chip a sealed space is formed and a substrate 373 is incorporated.

On the substrate 373, a code generator, a key generator, an encryptor/decryptor, a processor and a memory all of which form the computer according to the present invention, are integrat. On the lower half case 371 electrodes 374a and 374b in a form of through holes and electrodes 375a, 375b, and 375c for coupling to external devices are formed.

The through hole electrodes 374a, 374b are connected through bonding wires 376a, and 376b to the built-in IC substrate 373. The electrodes 375a, 375b, and 375c are compatible with the electrode standards for smart cards (for example, ISO/IEC 7816-2). When bonding the lower half 371 and upper half 372, any of methods with high strength such as welding may be used for maintaining the high airtightness in a sealed space formed in the IC chip module 370.

When attacked by an invader, there may be anomalies in the sealed space within the IC chip module, leading to that correct codes no longer are generated so that the secret information may be protected.

Next, Eighth preferred embodiment of the first computer according to the present invention will be described below.

FIG. 21 shows eighth preferred embodiment of the first computer unit according to the present invention, (A) is an exploded perspective view of the computer of the present invention, (B) is a sectional view of the computer shown in FIG. (A) taken along with the line AB.

A cryptographic processing unit 410 includes electrodes 412a, 412b, . . . , 412n; electrodes 413a, 413b, . . . , 413n, provided on a substrate 411, a code generator 414, and an isolation film 415 covering these components.

On a substrate 400, a memory 401, an encryptor/decryptor 402, a processor 403 and the like are integrated, which form, along with the cryptographic processing unit 410 integrated thereon, a computer. The encryptor/decryptor 402 is coupled to the code generator 414, which encrypts secret data based on the code supplied from the code generator 414 to cause memory 401 to record encrypted secret data, when recording secret data. When encrypted secret data is used, it decrypts the encrypted secret data based on the code supplied from the code generator 414 to output to the processor 403.

The electrodes 412a, 412b, . . . , 412n (where n is a given natural number) and the electrodes 413a, 413b, . . . , 413n forms $n^2$ capacitors having static capacitance based on the characteristics of the isolation film 415. For example, if n=6, then the number of capacitors to be formed will be 36. The static capacitance of formed capacitors may vary according to the surrounding materials and environmental condition, however the most important one is the isolation film 415.

In this preferred embodiment, when encryption/decryption of data, a code generator 414 selects a given electrode from electrodes 412a, 412b, . . . , 412n, and another given electrode from electrodes 413a, 413b, . . . , 413n. Then it detects the static capacitance of the pair of these electrodes to generate a code specified by the detected value.

Therefore, if an invader pierces the isolation film 415, or peels off it, correct codes no longer are generated. It should be noted that a plurality of pairs of electrodes forming capacitors may be selected for forming a specific code from their ratio or the difference of the static capacitance.

As have been described above, the computer unit according to the present invention prevents correct codes from being generated if any part of the isolation film 415 is broken. This provides a very simple structure with sufficiently high protection without the need to arrange sensors on entire surface of protection container or form in such high density as in the prior art.

As described above, in the computer according to the present invention, a code is generated each time secret data is encrypted/decrypted, and neither codes nor encryption keys/decryption keys are statically stored. Since secret information such as encryption key, decryption key, and codes are not statically stored, neither attack detector circuit nor deleting circuit for erasing secret information are required, so that power supply to these circuits no longer is needed. This allows smart cards without battery and portable information devices which requires power consumption as small as possible to be applied. Similarly, a protection circuit (temperature sensor or the like) for protecting against attack by cooling to a very low temperature to stop operation of unit to steal internal information is no longer required.

In the computer unit according to the present invention, no information will be lost even when a temporary abnormal code is generated by for example external noise, it will be sufficient to regenerate codes after the problem has been solved. This ensures that the data is not destructed by any malfunction.

Next, ninth preferred embodiment of the first computer according to the present invention will be described below.

FIG. 22 shows ninth preferred embodiment of the first computer unit according to the present invention, (A) is a sectional view of the first computer according to the present invention, (B) is a perspective diagram of the unit shown in (A) viewed from the direction F. The sectional view shown in (A) is the one taken along with the line CD of the perspective view shown in (B).

On a substrate 431, a memory 432, an encryptor/decryptor 433 incorporating a code generator, a processor 434 and the like are formed for the computer of the present invention. Just above them, an insulation layer 435 is provided. Above the insulation layer 435, electrodes 441a, 441b, . . . , 441n, and electrodes 442a, 442b, . . . , 442n are formed. A substrate 440 covered by an insulation film 443 is provided thereon. Between the encryptor/decryptor 433 incorporating a code generator and electrodes, there is formed a vertical wiring 436 formed by a through hole. For recording secret data, the encryptor/decryptor 433 encrypts secret data, causing the memory 432 to record encrypted secret data. For using encrypted secret data, the encryptor/decryptor 433 decrypts the encrypted secret data to output to the processor 434 or the like.

The electrodes 441a, 441b, . . . , 441n (where n is a given natural number) and electrodes 442a, 442b, . . . , 442n forms $n^2$ capacitors having static capacitance based on the characteristics of the isolation film 443. For example, if n=5, then the number of capacitors to be formed will be 25. The static capacitance of formed capacitors may vary according to the surrounding materials and environmental condition, however the most important one is the isolation film 443.

In this preferred embodiment, when encryption/decryption of data, a code generator 433 selects a given electrode from electrodes 441a, 441b, . . . , 441n and another given electrode from electrodes 442a, 442b, . . . , 442n. Then it detects the static capacitance of the pair of these electrodes to generate a code specified by the detected value.

Therefore, if an invader pierces the isolation film 443, or peels off it, correct codes no longer are generated. It should be noted that a plurality of pairs of electrodes forming capacitors may be selected for forming a specific code from their ratio or the difference of the static capacitance.

As have been described above, the computer unit according to the present invention prevents correct codes from being generated if any part of the isolation film 443 is broken. This provides a very simple structure with sufficiently high protection without the need to arrange sensors on entire surface of protection container or form in such high density as in the prior art.

As described above, in the computer according to the present invention, a code is generated each time secret data is encrypted/decrypted, and neither codes nor encryption keys/decryption keys are statically stored. Since secret information such as encryption key, decryption key, and codes are not statically stored, neither attack detector circuit nor deleting circuit for erasing secret information are required, so that power supply to these circuits no longer is needed. This allows smart cards without battery and portable information devices which requires power consumption as small as possible to be applied. Similarly, a protection circuit (temperature sensor or the like) for protecting against attack by cooling to a very low temperature to stop operation of unit to steal internal information is no longer required.

In the computer unit according to the present invention, no information will be lost even when a temporary abnormal code is generated by for example external noise, it will be sufficient to regenerate codes after the problem has been solved. This ensures that the data is not destructed by any malfunction.

Next, first preferred embodiment of the second computer according to the present invention.

FIG. 23 is a schematic diagram showing first preferred embodiment of the second computer according to the present invention.

A computer unit 500 is formed by adhering a cell 501, and a substrate 502, forming sealed spaces therein. In this sealed space, inert gas such as helium and argon, or a gas having compatible chemical stability is encapsulated at a given different pressure. The pressure of the gas is not necessarily at a specific level, rather, it is preferable to be an appropriate random value (random number). The cell 501 may be formed of materials which is chemically/physically durable such as ceramics and metals. When joining the cells 501 with the substrate 502, any of methods with high strength such as laser welding, soldering which enables bonding at the atom level of materials, solid bonding, and the like, may be used for maintaining the high airtightness in two sealed spaces formed in the computer unit 500.

On the substrate 502, a security code generator 503, a data eraser 504, and a memory 505 are mounted. The security code generator 503 always generates security codes specified by the gas pressure in sealed spaces, security codes thus generated are input to the data eraser 504 sequentially.

In this preferred embodiment, a data processing circuit for processing secret data is located on the substrate 502 or another location (not shown). The memory 505 receives and sends secret data from and to this data processing circuit and stores secret data.

In the data eraser 504 stores a security code as a reference code in a condition that the sealed space is normal, and it sequentially matches the security codes input thereto and deletes the secret data in the memory 505 if the security code is not matched with the reference code.

When, to the computer unit 500 of such a structure, an invader attempts to attack in order to steal secret data, even if only one point of wall is broken, the internal pressure of the fluid in the sealed space changes. Thus the security codes generated thereafter will not match to the reference code, so that the secret data stored in the memory 505 will be erased by the data eraser 504. At this point, only one pressure sensor which is used as the security code generator 503 is sufficient in the sealed space, very simple structure with sufficiently high protection without the need to arrange sensors on entire surface of protection container as in the prior art.

A variety of sensors may be used for the security code generator 503. One example will be described below.

FIG. 24 is a sectional view illustrating the principle of an example of pressure sensor applicable to the security code generator 503 of the computer unit 500 shown in FIG. 23.

The pressure sensor 510 is made by adhering a substrate 511 with a cell 512. The cell 512 contains in its internal sealed space 513, a gas of a given pressure, while the substrate 511 provides a piezoelectric element 514 for detecting the pressure value and a sealed space 515.

The shape of the piezoelectric element 514 deforms due to the gas pressure in the sealed space 513 and the gas pressure in the sealed space 515. The resistance of the piezoelectric element 514 varies according to its shape. When the pressure sensor 510 is in a normal condition, the piezoelectric element 514 retains always the same shape, so that a constant current I input thereto results in a constant voltage output, allowing a reference code to be generated therefrom.

If there is a change in the pressure sensor 510 due to for example an attack by an invader, and the pressure in the sealed space 513 varies, the piezoelectric element 514 will be deformed. Together with the deformation, the resistance of the piezoelectric element 514 changes, so that the security code derived from the voltage retrieved from the current I will not match with the reference code.

As can be seen, in case of the pressure sensor 510, any change in the gas pressure in the 513 causes the deformation of the piezoelectric element 514. Therefore, if there is a change caused by an attack to the cell 512 by an invader, the security code will not match with the reference code, so that the deleting circuit will delete the secret data.

When this pressure sensor 510 is applied to the computer unit 500 according to the present invention shown in FIG. 23, the cell 501 and the substrate 502 in FIG. 23 corresponds to the cell 512 and the substrate 511 in FIG. 24.

Next, second preferred embodiment of the second computer according to the present invention.

FIG. 25 is a schematic diagram showing second preferred embodiment of the second computer according to the present invention.

A computer unit 520 is formed by adhering cells 521a 521b, and a substrate 522, forming two sealed spaces therein. The cells hold the substrate between them from both upside and downside, each sealed space being completely separated by the substrate 522. In the cells 521a and 521b, inert gas such as helium and argon, or a gas having compatible chemical stability is encapsulated at a given different pressure. The cells 521a and 521b may be formed of materials which is chemically/physically durable such as ceramics and metals. When bonding the cells 521a and 521b and the substrate 522, any of methods with high strength such as laser welding, soldering which enables bonding at the atom level of materials, solid bonding, and the like, may be used for maintaining the high airtightness in two sealed spaces formed in the computer unit 520.

On the substrate 522, a security code generator 523, a data eraser 524, a memory 525 and a controller such as a CPU, are mounted.

In this preferred embodiment, a pressure sensor which may generates codes according to the pressure ratio in two cells are used for the security code generator 523. For example, pressure sensors are disposed to both two cells, as the security code generator 523, and a computing circuit for the ratio of the output value of these pressure sensors are added, a security code corresponding to the pressure ratio may be generated. The gas pressure ratio will seldom vary in case of changes of the environmental temperature on whole device. Thus, as in this preferred embodiment, if the gas pressure ratio is used for a security code, the risk of deleting accidentally secret data may be reduced.

Then, third preferred embodiment of the second computer according to the present invention.

FIG. 26 is a schematic diagram showing third preferred embodiment of the second computer according to the present invention.

A computer 550 is formed by adhering a cell 551, and a substrate 552, forming sealed spaces therein. In this sealed space, a mixture of gases at a specific ratio of component gas is enclosed. The cell 551 may be formed of materials which is chemically/physically durable such as ceramics and metals. When bonding the cell 551 to the substrate 552, any of methods with high strength such as laser welding, soldering which enables bonding at the atom level of materials, solid bonding, and the like, may be used for maintaining the high airtightness in a sealed space formed in the information processing unit 550.

On the substrate 552, a security code generator 560, a data eraser 554, a memory 555 and a controller 556 such as a CPU, are mounted. The security code generator 560 is composed of a LED 561, a grating 562, a photodiode array 563, and an A/D converter and the like.

When the code generator 560 generates codes, light beam is initially emitted from the LED 561. The beam passes through the gas in the sealed space formed of the cell 551 and substrate 552, then diffracted by the grating 562. The diffraction passes again through the gas in the sealed space and then is incident into the array of photodiodes 563. The photodiode array 563 detects by splitting the incident beam into wavelength bands, to obtain a voltage pattern changing according to the ingredient information of the gas. Thus, obtained voltage pattern is digitized by the A/D converter to input to the deleting circuit 554.

The light beam emitted from the LED 561 may be absorbed or refracted when passing through the sealed space formed by the cell 551 and the substrate 552, the amount of absorption or refraction varies according to the ingredient ratio of the gas. Thus, if the ingredient ratio of the gas changes due to the attack, the voltage pattern detected by the photodiode array 563 eventually changes, so that no correct code will be output.

There are LEDs for wavelength range of 500 nm to 1000 nm or more which are commercially available for use in the LED 561. Any of these LEDs may be used. The ingredient ratio of the gas mixture enclosed in the sealed space should have absorption lines in that range. For example, pure Ar gas has absorptions with relatively large transition such as 415.86, 425.94, 763.51, 794.82, 811.53 nms in a range of 400–900 nm. There are many absorptions in the He and Xe gases. Other than rare gases, some molecular gases are confirmed to have many absorptions in there absorption range. This an appropriate mixture of these gases is sufficient for enclosing in the sealed space.

Instead of the components of the gas, since the mixture ratio data is used, oxygen or nitrogen in the open air may be encapsulated. By shielding parallel plates an appropriate absorption rate may become available, for some absorption lines with low coefficient.

Effect of the Present Invention

As described above, the encryptor according to the present invention does not store in memory any encryption keys and codes used when encrypting secret data. Thus, this prevents any intrusion to the encryption processing of the secret data without providing an attack detection circuit or a data deleting circuit.

The decryptor according to the present invention does not store in memory any decryption keys and codes used when decrypting secret data. Thus, this prevents any intrusion to the decryption processing of the secret data without providing an attack detection circuit or a data deleting circuit. The secret data processor unit according to the present invention does not store in memory any encryption keys and codes used when encrypting secret data, and any decryption keys and codes used when decrypting secret data. Thus, this prevents any intrusion to the encryption processing of the secret data without providing an attack detection circuit or a data deleting circuit.

The first computer unit according to the present invention does not store in memory any encryption keys and codes used when encrypting secret data, and any decryption keys and codes used when decrypting secret data. Thus, this prevents any intrusion to the encryption process of the secret data without providing an attack detection circuit or a data deleting circuit.

The second computer according to the present invention detects the presence or absence of any attack from outside by sensing the change in the pressure value in a sealed space for deleting secret infomation. Thus fewer attack detector circuits are sufficient for protecting against an intrusion.

What is claimed is:

1. An encryptor for encrypting secret data, comprising:
   means for containing a fluid in a sealed space;
   code generation means disposed in the sealed space for generating codes specific to a pressure value of said fluid;
   means disposed in the sealed space for generating an encryption key based on said codes; and
   means disposed in the sealed space for generating encrypted secret data by encrypting said secret data by using said encryption key.

2. The encryptor according to claim 1, wherein said sealed space is partitioned into a plurality of sections, said code generation means generates codes based on a comparison of pressure values of the fluid in said sections.

3. An encryptor for encrypting secret data, comprising:
   means for containing a fluid containing predetermined ingredients in a sealed space;
   code generation means disposed in the sealed space for generating codes specific to optical characteristics which vary, according to the ingredients of said fluid;
   means disposed in the sealed space for generating encryption key based on said codes; and
   means disposed in the sealed space for generating an encrypted secret data by encrypting said secret data by using said encryption key.

4. The encryptor according to claim 3, wherein said code generation means comprises:
   a light source;
   spectrometer means located in a light path of a light emitted from said light source for separating said light into its components by wavelength; and
   photoelectric converting means for converting to one or more electrical signals the components of said light being separated by the spectrometer means.

5. The encryptor according to claim 3, wherein said code generation means generates codes according to an absorption ratio of the optical characteristics of the fluid ingredients.

6. The encryptor according to claim 3, wherein said code generation means generates codes according to a refraction ratio of the optical characteristics of the fluid ingredients.

7. The encryptor according to claim 4, wherein said light source is composed of light emitting diodes, which may be laser diodes, said spectrometer means is composed of a diffractor, which may be a prism, and said photoelectric converting means is composed of an array of photodiodes.

8. An encryptor for encrypting secret data, comprising:
   means for retaining in a sealed space a material which has desired characteristic values only in the sealed space;
   code generation means disposed in said sealed space, for generating codes based on said characteristic values;
   means disposed in said sealed space, for generating an encryption key based on said codes; and
   means disposed in said sealed space for generating encrypted secret data by encrypting said secret data by using said encryption key.

9. An encryptor for encrypting secret data, comprising:
   a capacitor composed of a pair of electrodes and an isolating film which covers at least one of said electrodes, and having static capacitance according to characteristic values of said isolating film;
   code generation means coated with said isolating film, for generating codes specified from the static capacitance of said capacitor;
   means for generating an encryption key according to said codes; and means for generating encrypted secret data by encrypting said secret data by using said encryption key.

10. The encryptor according to claim 9, that includes a plurality of said capacitors, said code generation means generating specific codes based on a comparison of static capacitances of said plurality of capacitors.

11. A decryptor for decrypting encrypted secret data, comprising:
    means for containing a fluid in a sealed space;
    code generation means disposed in the sealed space for generating codes specific to a pressure value of said fluid;
    means disposed in the sealed space for generating a decryption key based on said codes; and
    means disposed in the sealed space for recovering secret data by decrypting said encrypted secret data by using said decryption key.

12. The decryptor according to claim 11, wherein said sealed space is partitioned into a plurality of sections, and said code generation means generates specific codes based on a comparison of pressure values of the fluid in said sections.

13. A decryptor for decrypting encrypted secret data, comprising:
    means for containing a fluid the fluid containing predetermined ingredients in a sealed space;
    code generation means disposed in the sealed space for generating codes specific to optical characteristics which vary according to the ingredients of said fluid;
    means disposed in the sealed space for generating decryption key based on said codes; and
    means disposed in the sealed space for recovering secret data by decrypting said encrypted secret data by using said decryption key.

14. The decryptor according to claim 13, wherein said code generation means comprises:
    a light source;
    spectrometer means located in a light path of a light emitted from said light source for separating said light into its components by wavelength; and
    photoelectric converting means for converting to one or more electrical signals, the components of said light being separated by the spectrometer means.

15. The decryptor according to claim 13, wherein said code generation means generates codes according to an absorption ratio of the optical characteristics of the ingredients contained in the fluid.

16. The decryptor according to claim 13, wherein said code generation means generates codes according to a refraction ratio of the optical characteristics of the ingredients contained in the fluid.

17. The decryptor according to claim 14, wherein said light source is composed of light emitting diodes, which may be laser diodes, said spectrometer means is composed of a diffractor, which may be a prism, and said photoelectric converting means including an array of photodiodes.

18. A decryptor for decrypting encrypted secret data, comprising:
    means for retaining a material in a sealed space which has desired characteristic values only in the sealed space;
    code generation means disposed in said sealed space, for generating codes based on said characteristic values;
    decryption key generation means disposed in the sealed space for generating a decryption key based on said codes; and
    means disposed in the sealed space for forming secret data by decrypting said encrypted secret data by use of said decryption key generated by the decryption generation means in decrypting the encrypted secret data.

19. A decryptor for decrypting encrypted secret data, comprising:
    a capacitor composed of a pair of electrodes and an isolating film which covers at least one of said electrodes, and having static capacitance according to characteristic values of said isolating film;
    code generation means coated with said isolating film, for generating codes based on from the static capacitance of said capacitor;
    means for generating a decryption key according to said codes;
    means for generating secret data by decrypting said encrypted secret data by using said decryption key.

20. The decryptor according to claim 19, that includes a plurality of said capacitors, and said code generation means generating specific codes based on a comparison of static capacitances of said plurality of capacitors.

21. A cryptographic processor for processing secret data and for protecting the secret data from intrusion, comprising:
    means for containing a fluid in a sealed space;
    code generation means disposed in the sealed space for generating codes specific to a pressure value of said fluid;
    encryption means disposed in the sealed space, for generating encrypted secret data by encrypting said secret data by generating an encryption key based on the codes generated by the code generation means at a time of a request for generating encrypted secret data from said secret data; and
    decryption means disposed in the sealed space, for recovering the secret data by decrypting said encrypted secret data by generating a decryption key based on the codes generated by the code generation means at a time of a request for restoring secret data for said encrypted secret data.

22. The cryptographic processor according to claim 21, wherein said sealed space is partitioned into a plurality of sections, said code generation means generates specific codes based on a comparison of pressure values of said fluid in said sections.

23. A cryptographic processor for processing secret data and for protecting the secret data from intrusion, comprising:

means for containing a fluid the fluid containing predetermined ingredients in a sealed space;

code generation means disposed in the sealed space for generating codes specific to optical characteristics which vary according to the ingredients contained in said fluid;

encryption means disposed in the sealed space, for generating encrypted secret data by encrypting said secret data by generating an encryption key based on the codes generated by the code generation means at a time of a request for generating encrypted secret data from said secret data; and decryption means disposed in the sealed space, for generating the secret data by decrypting said encrypted secret data by generating a decryption key based on the codes generated by the code generation means at a time of a request for recovering the secret data for said encrypted secret data.

24. The cryptographic processor according to claim 23, wherein said code generation means comprises:

a light source;

spectrometer means located in a light path of a light emitted from said light source for separating said light into its components by wavelength; and photoelectric converting means for converting to one or more electrical signals the components of light being separated by the spectrometer means.

25. The cryptographic processor according to claim 23, wherein said code generation means generates codes according to an absorption ratio of the optical characteristics of the ingredients contained in the fluid.

26. The cryptographic processor according to claim 23, wherein said code generation means generates codes according to a refraction ratio of the optical characteristics of the ingredients contained in the fluid.

27. The cryptographic processor according to claim 24, wherein said light source is composed of light emitting diodes, which may be laser diodes, said spectrometer means is composed of a diffractor, which may be a prism, and said photoelectric converting means including an array of photodiodes.

28. The cryptographic processor for processing secret data and for protecting the secret data from intrusion, comprising:

means for retaining in a sealed space a material which has desired characteristic values only in the sealed space;

code generation means disposed in said sealed space, for generating codes based on from said characteristic values;

encryption means disposed in the sealed space, for generating encrypted secret data by encrypting said secret data by generating an encryption key based on the codes generated by the code generation means at a time of a request for generating encrypted secret data from said secret data; and decryption means disposed in the sealed space, for generating the secret data by decrypting said encrypted secret data by generating a decryption key based on the codes generated by the code generation means at a time of a request for recovering the secret data for said encrypted secret data.

29. A cryptographic processor for processing secret data and for protecting the secret data from intrusion, comprising:

a capacitor comprising a pair of electrodes and an isolating film which covers at least one of said electrodes, the capacitor having static capacitance according to characteristic values of said isolating film;

code generation means coated with said isolating film, for generating codes based on the static capacitance of said capacitor;

encryption means for generating encrypted secret data by encrypting said secret data by generating an encryption key based on the codes generated by the code generation means at a time of a request for generating encrypted secret data from said secret data; and decryption means for generating the secret data by decrypting said encrypted secret data by generating a decryption key based on the codes generated by the code generation means at a time of a request for recovering the secret data for said encrypted secret data.

30. The cryptographic processor according to claim 29, that includes a plurality of said capacitors, said code generating means generates specific codes based on a comparison of the static capacitances of said plurality of capacitors.

31. A computer for processing secret data and for protecting the secret data from intrusion, comprising:

means for containing a fluid in a sealed space;

processing means disposed in the sealed space for carrying out a variety of processing with respect to said secret data;

code generation means disposed in the sealed space for generating codes specific to a pressure value of said fluid;

encryption means disposed in the sealed space, for generating encrypted secret data by encrypting said secret data by generating an encryption key based on the codes generated by the code generation means at a time of a request for generating encrypted secret data from said secret data;

data storage for storing said encrypted secret data; and decryption means disposed in the sealed space, for generating the secret data by decrypting said encrypted secret data by generating a decryption key based on the codes generated by the code generation means at a time of a request for recovering the secret data for said encrypted secret data.

32. A computer for processing secret data and for protecting the secret data from intrusion, comprising:

means for containing a fluid, the fluid containing predetermined ingredients in a sealed space;

processing means disposed in the sealed space for carrying out a variety of processing with respect to said secret data;

code generation means disposed in the sealed space for generating codes specific to optical characteristics which vary according to the ingredients contained in said fluid;

encryption means disposed in the sealed space, for generating encrypted secret data by encrypting said secret data by generating an encryption key based on the codes generated by the code generation means at a time of a request for generating encrypted secret data from said secret data;

data storage for storing said encrypted secret data; and decryption means disposed in the sealed space, for generating the secret data by decrypting said encrypted secret data by generating a decryption key based on the codes generated by the code generation means at a time of a request for recovering the secret data for said encrypted secret data.

33. A computer for processing secret data and for protecting the secret data from intrusion, comprising:

means for retaining a material in a sealed space which has desired characteristic values only in a sealed space;

means disposed in the sealed space for carrying out a variety of processing with respect to said secret data;

code generation means disposed in said sealed space, for generating codes specified from said characteristic values;

encryption means disposed in the sealed space, for generating encrypted secret data by encrypting said secret data by generating an encryption key based on the codes generated by the code generation means at a time of a request for generating encrypted secret data from said secret data;

data storage for storing said encrypted secret data; and decryption means disposed in the sealed space, for generating the secret data by decrypting said encrypted secret data by generating a decryption key based on the codes generated by the code generation means at a time of a request for recovering the secret data for said encrypted secret data.

34. A computer for processing secret data and for protecting the secret data from intrusion, comprising:

a capacitor composed of a pair of electrodes and an isolating film which covers at least one of said electrodes, the capacitor having static capacitance according to characteristic values of said isolating film;

code generation means, covered by said isolating film, for generating codes based on the static capacitance of said capacitor;

encryption means for generating encrypted secret data by encrypting said secret data by generating an encryption key based on the codes generated by the code generation means at a time of a request for generating encrypted secret data from said secret data;

data storage that stores said encrypted secret data; and decryption means for generating secret data by decrypting said encrypted the secret data by generating the decryption key based on the codes generated by the code generation means at a time of a request for recovering the secret data for said encrypted secret data.

35. A computer according to claim 34, that includes a plurality of said capacitors, said code generation means generating specific codes based on a comparison of static capacitances of said plurality of capacitors.

36. A computer for processing secret data and for protecting the secret data from intrusion, comprising:

means for containing fluid in a sealed space;

means disposed in the sealed space for carrying out a variety of processing with respect to said secret data;

data storage means disposed in the sealed space for storing said secret data;

security code generation means disposed in the sealed space for generating a security code specified by a pressure value of said fluid;

data deleting means storing a reference security code as a reference code in a condition that the sealed space is normal, for deleting said secret data in the data storage if the security code generated by said security code generation means is not matched with said reference code.

37. A computer for processing secret data and for protecting the security data from intrusion, comprising:

means for containing a fluid, the fluid containing predetermined ingredients in a sealed space;

means disposed in said sealed space for processing said secret data;

data storage means disposed in said sealed space for storing said secret data;

security code generation means disposed in the sealed space for generating a security code specific to optical characteristics which vary according to the ingredients contained in said fluid; data deleting means storing a reference security code as a reference code in a condition that the sealed space is normal, for deleting said secret data in the data storage if the security code generated by said security code generation means is not matched with said reference code.

38. A computer for processing secret data and for protecting the secret data from intrusion, comprising:

means for retaining in a sealed space a material which has desired characteristic values only in the sealed space;

means disposed in said sealed space for processing said secret data;

data storage means disposed in said sealed space for storing said secret data;

security code generation means disposed in said sealed space, for generating a security code specified from said characteristic values;

data deleting means storing a reference security code as a reference code in a condition that the sealed space is normal, for deleting said secret data in the data storage if the security code generated by said security code generation means is not matched with said reference code.

39. A computer for processing secret data and for protecting the secret data from intrusion, comprising:

a capacitor composed of a pair of electrodes and an isolating film which covers at least one of said electrodes, the capacitor having static capacitance according to the characteristic values of said isolating film;

means covered by said isolating film, for carrying out a variety of processing with respect to said secret data;

data storage covered by said isolating film, for storing said secret data;

security code generation means covered by said isolating film, for generating a security code specified from the static capacitance of said capacitor; and data deleting means storing a reference security code as a reference code in a condition that the capacitor is normal, for deleting said secret data in the data storage if the security code generated by said security code generation means is not matched with said reference code.

40. The computer according to claim 39, that includes a plurality of said capacitors, and said security code generation means generating specific security codes based on a comparison of static capacitances of said plurality of capacitors.

41. An encryption device that encrypts secret data, comprising:

a sealed enclosure;

a material that has desirable characteristic values only when disposed in the sealed enclosure; and a code generator disposed in the sealed enclosure that generates an encryption key based on the desired characteristic values of the material.

42. The encryption device of claim 41, wherein the sealed enclosure is a mechanical seal against fluid and/or pressure.

43. The encryption device of claim 41, wherein the characteristic values are pressure values and the sealed enclosure is partitioned into a plurality of sections, the code generator generating the encryption key based on the pressure values of said material in said plurality of sections.

* * * * *